US012794622B2

(12) United States Patent
Li et al.

(10) Patent No.: US 12,794,622 B2
(45) Date of Patent: Nov. 10, 2026

(54) RESOURCE SCHEDULING METHOD AND COMMUNICATION DEVICE

(71) Applicant: Huawei Technologies Co., Ltd., Shenzhen (CN)

(72) Inventors: Xinxian Li, Shanghai (CN); Jinlin Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 18/352,321

(22) Filed: Jul. 14, 2023

(65) Prior Publication Data

US 2023/0361961 A1 Nov. 9, 2023

Related U.S. Application Data

(63) Continuation of application No. PCT/CN2021/093104, filed on May 11, 2021.

(30) Foreign Application Priority Data

Jan. 15, 2021 (WO) ................ PCT/CN2021/072317

(51) Int. Cl.

*H04L 5/00* (2006.01)
*H04W 72/21* (2023.01)
*H04W 72/27* (2023.01)

(52) U.S. Cl.

CPC .......... *H04L 5/0048* (2013.01); *H04L 5/0046* (2013.01); *H04W 72/21* (2023.01); *H04W 72/27* (2023.01)

(58) Field of Classification Search

CPC ............................. H04L 5/0048; H04W 72/27

See application file for complete search history.

(56) References Cited

U.S. PATENT DOCUMENTS

2017/0195999 A1 7/2017 Feng et al.
2019/0215117 A1* 7/2019 Lee ....................... H04L 5/0094

(Continued)

FOREIGN PATENT DOCUMENTS

CN 111132359 A 5/2020
CN 111586858 A 8/2020

(Continued)

OTHER PUBLICATIONS

"5G; NR; Radio Resource Control (RRC); Protocol specification (3GPP TS 38.331 version 15.3.0 Release 15)", ETSI Technical Specification, European Telecommunications Standards Institute (ETSI), 650, Route Des Lucioles ; F-06921 Sophia-Antipolis ; France, vol. 3GPP RAN, No. V15.3.0 Oct. 16, 2018 (Oct. 16, 2018), pp. 1-441, XP014330489.

(Continued)

*Primary Examiner* — Abdeltif Ajid
(74) *Attorney, Agent, or Firm* — Slater Matsil, LLP

(57) ABSTRACT

This application provides a resource scheduling method and a communication device. The method includes: receiving a first message on a first downlink carrier of a first cell, where the first message indicates scheduling information of a physical downlink shared channel PDSCH, and the PDSCH corresponds to the first downlink carrier of the first cell and a second downlink carrier of a second cell; receiving a second message, where the second message indicates scheduling information of a physical uplink shared channel PUSCH of a first uplink carrier of the second cell; and sending the PUSCH on the first uplink carrier of the second cell based on the second message.

20 Claims, 8 Drawing Sheets

(56) References Cited

U.S. PATENT DOCUMENTS

| | | | | |
|---|---|---|---|---|
| 2019/0313429 | A1 | 10/2019 | Cheng | |
| 2021/0329546 | A1* | 10/2021 | Wang | H04L 5/001 |
| 2022/0116924 | A1* | 4/2022 | Takeda | H04B 7/06968 |
| 2022/0131669 | A1* | 4/2022 | Takeda | H04L 5/001 |
| 2022/0225215 | A1* | 7/2022 | Babaei | H04W 48/16 |
| 2023/0224833 | A1* | 7/2023 | Wang | H04L 5/001 370/350 |
| 2024/0080169 | A1* | 3/2024 | He | H04L 5/0048 |
| 2024/0195566 | A1* | 6/2024 | Ohara | H04L 5/0057 |

FOREIGN PATENT DOCUMENTS

| | | | | | |
|---|---|---|---|---|---|
| CN | 111934837 | A | | 11/2020 | |
| WO | WO-2021135251 | A1 | * | 7/2021 | H04W 72/23 |

OTHER PUBLICATIONS

"3rd Generation Partnership Project; Technical Specification Group Radio Access Network; NR; Medium Access Control (MAC) protocol specification (Release 16)", 3GPP TS 38.321 V16.3.0, Technical Specification, (Dec. 2020), 156 Pages.

"3rd Generation Partnership Project; Technical Specification Group Radio Access Network; NR; Physical layer procedures for data (Release 16)", 3GPP TS 38.214 V16.4.0, Technical Specification, (Dec. 2020), 169 Pages.

"3rd Generation Partnership Project; Technical Specification Group Radio Access Network; NR; Requirements for support of radio resource management (Release 17)", 3GPP TS 38.133 V17.0.0, Technical Specification, (Dec. 2020), 1812 Pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Technical Specification, (Dec. 2020), 254 Pages.

"3rd Generation Partnership Project; Technical Specification Group Radio Access Network; NR; Radio Resource Control (RRC) protocol specification (Release 16)", 3GPP TS 38.331 V16.3.1, Technical Specification, (Jan. 2021), 932 Pages.

CATT, "Discussion on cross-carrier scheduling from Scell to Pcell", 3GPP TSG RAN WG1 #103-e, R1-2007839, Oct. 26-Nov. 13, 2020, 5 Pages, e-Meeting.

Huawei, et al., "Discussion on multi-carrier scheduling using single PDCCH", 3GPP TSG RAN WG1 Meeting #103-e, R1-2007580, Oct. 26-Nov. 13, 2020, 17 Pages, E-meeting.

Vivo, "Discussion on joint scheduling", 3GPP TSG RAN WG1 #102, R1-2006987, (updated from R1-2005410), Aug. 17-28, 2020, 8 Pages, e-Meeting.

* cited by examiner

RESOURCE SCHEDULING METHOD AND COMMUNICATION DEVICE

CROSS-REFERENCE TO RELATED APPLICATIONS

This application is a continuation of International Application No. PCT/CN2021/093104, filed on May 11, 2021, which claims priority to International Application No. PCT/CN2021/072317, filed on Jan. 15, 2021. The disclosures of the aforementioned applications are hereby incorporated by reference in their entireties.

TECHNICAL FIELD

This application relates to the communication field, and more specifically, to a resource scheduling method and a communication device.

BACKGROUND

In a long term evolution-advanced (LTE-A) system, a carrier aggregation (CA) technology is introduced to support a larger transmission bandwidth. Currently, when user equipment (UE) is in a carrier aggregation scenario, a network device may schedule a physical downlink shared channel (PDSCH) or a physical uplink shared channel (PUSCH) of one carrier by using one piece of downlink control information (DCI).

However, with increasing communication requirements, frequent scheduling of resources may result in excessive control signaling overheads.

Therefore, to reduce control signaling overheads, how to schedule data on a plurality of carriers by using one piece of downlink control information DCI to meet diversified scheduling requirements is a technical problem that needs to be urgently resolved.

SUMMARY

This application provides a resource scheduling method and a communication device, to effectively reduce control signaling overheads, and implement diversified communication scheduling requirements and system effectiveness.

According to a first aspect, a resource scheduling method is provided, including: receiving a first message on a first downlink carrier of a first cell, where the first message indicates scheduling information of a physical downlink shared channel PDSCH, and the PDSCH corresponds to the first downlink carrier of the first cell and a second downlink carrier of a second cell; receiving a second message, where the second message indicates scheduling information of a physical uplink shared channel PUSCH of a first uplink carrier of the second cell; and sending the PUSCH on the first uplink carrier of the second cell based on the second message.

According to the solution provided in this application, a terminal device receives the first message on the first downlink carrier of the first cell, to schedule the PDSCH of the first downlink carrier of the first cell and the PDSCH of the second downlink carrier of the second cell. In this scenario, the terminal device receives second message, to schedule the PUSCH of the first uplink carrier of the second cell and send the PUSCH to a network device. This effectively reduces control signaling overheads, meets diversified scheduling requirements, and implements communication diversity and system effectiveness.

For example, the PDSCH includes a first PDSCH and a second PDSCH, the first PDSCH corresponds to the first cell, and the second PDSCH corresponds to the second cell.

For example, the PDSCH includes a third PDSCH, and the third PDSCH corresponds to the first cell and the second cell.

With reference to the first aspect, in some implementations of the first aspect, the receiving a second message includes: receiving the second message on the second downlink carrier of the second cell; receiving the second message on the first downlink carrier of the first cell; or receiving the second message on a third downlink carrier of a third cell.

For example, when this carrier supports scheduling of a PUSCH, the terminal device may further receive DCI on the second downlink carrier of the second cell, where the DCI indicates scheduling information corresponding to a PDSCH of a third downlink carrier of the second cell.

For example, the terminal device may further receive DCI on the second downlink carrier of the second cell, where the DCI indicates the terminal device to schedule a PUSCH or a PDSCH of the second cell in a cross-carrier manner, and/or indicates the terminal device to jointly schedule a PDSCH of the second cell and a PDSCH of the third cell.

For example, when this carrier does not support scheduling of a PUSCH, the terminal device may further receive DCI on the first downlink carrier of the first cell, where the DCI indicates the terminal device to schedule the PDSCH on the first downlink carrier of the first cell in a downlink cross-carrier manner.

For example, the terminal device may further receive DCI on the first downlink carrier of the first cell, where the DCI indicates the terminal device to schedule a PUSCH or a PDSCH of the third cell in a cross-carrier manner, and/or indicates the terminal device to jointly schedule a PDSCH of the first cell and a PDSCH of the third cell in a downlink manner.

With reference to the first aspect, in some implementations of the first aspect, the method further includes: receiving first configuration information of the first cell, where the first configuration information of the first cell indicates a first search space; detecting a third message in the first search space, where the third message indicates a scheduling message of a third PDSCH of the first downlink carrier of the first cell or a scheduling message of a first PUSCH of a second uplink carrier of the first cell; receiving first configuration information of the second cell, where the first configuration information of the second cell indicates a second search space; and detecting the first message in the second search space.

With reference to the first aspect, in some implementations of the first aspect, the method further includes: detecting the first message in the first search space, where the first configuration information of the first cell is the same as the first configuration information of the second cell, and the second search space is the same as the first search space.

It should be understood that, in the foregoing possible implementation, both search spaces for self-scheduling and joint scheduling exist and are shared, that is, the terminal device may alternatively blindly detect the first message in the first search space.

With reference to the first aspect, in some implementations of the first aspect, the method further includes: receiving second configuration information of the first cell, where the second configuration information of the first cell indicates a third search space; detecting a fourth message in the third search space, where the fourth message indicates a scheduling message of a third PDSCH of the first downlink carrier of the first cell or a scheduling message of a first PUSCH of a second uplink carrier of the first cell; and detecting the first message in the third search space.

It should be understood that, in the foregoing possible implementation, there is a self-scheduling search space, and the first message may also be blindly detected in the self-scheduling search space.

With reference to the first aspect, in some implementations of the first aspect, the method further includes: receiving second configuration information of the second cell, where the second configuration information of the second cell indicates a fourth search space; and detecting the second message in the fourth search space.

With reference to the first aspect, in some implementations of the first aspect, the method further includes: receiving third configuration information of the second cell, where the third configuration information of the second cell indicates a fifth search space, and the fifth search space is used for detecting the first message; and detecting the second message in the fifth search space, where the second configuration information of the second cell is the same as the third configuration information of the second cell, and the fourth search space is the same as the fifth search space.

It should be understood that, in the foregoing possible implementation, both search spaces for joint scheduling and uplink scheduling exist and are shared, that is, the terminal device may alternatively blindly detect the second message in the search space for joint scheduling.

With reference to the first aspect, in some implementations of the first aspect, the method further includes: receiving fourth configuration information of the second cell, where the fourth configuration information of the second cell indicates a sixth search space, and the sixth search space is used for detecting the first message; and detecting the second message in the sixth search space.

It should be understood that, in the foregoing possible implementation, there is a search space for joint scheduling, and the second message is also blindly detected in the search space for joint scheduling.

With reference to the first aspect, in some implementations of the first aspect, the method further includes: receiving first indication information, where the first indication information indicates to detect the first message in a seventh search space, or the first indication information indicates to detect the first message in an eighth search space, the seventh search space includes a search space used to carry a fifth message, the fifth message indicates a search space of a fifth PDSCH of the first downlink carrier of the first cell or a third PUSCH of a second uplink carrier of the first cell, and the eighth search space includes a search space used to carry the first message; and the receiving a first message on a first downlink carrier of a first cell includes: receiving the first message on the first downlink carrier of the first cell based on the first indication information.

For example, when the first indication information indicates to detect the first message in the eighth search space, the method further includes: receiving fifth configuration information, where the fifth configuration information indicates the eighth search space, and the fifth configuration information includes configuration information related to the second cell.

For example, when the first indication information indicates to detect the first message in the seventh search space, the method further includes: receiving sixth configuration information, where the sixth configuration information indicates the seventh search space, the seventh search space includes the eighth search space, and the sixth configuration information includes configuration information related to the first cell.

In conclusion, the terminal device may monitor, in the first cell and/or the second cell based on different configuration information, at least one of PDCCHs corresponding to self-scheduling, cross-carrier scheduling, and joint scheduling.

According to a second aspect, a resource scheduling method is provided, including: sending a first message on a first downlink carrier of a first cell, where the first message indicates scheduling information of a physical downlink shared channel PDSCH, and the PDSCH corresponds to the first downlink carrier of the first cell and a second downlink carrier of a second cell; sending a second message, where the second message indicates scheduling information of a physical uplink shared channel PUSCH of a first uplink carrier of the second cell; and receiving the PUSCH on the first uplink carrier of the second cell based on the second message.

According to the solution provided in this application, a network device can schedule the PDSCH of the first downlink carrier of the first cell and the PDSCH of the second downlink carrier of the second cell by sending the first message on the first downlink carrier of the first cell. In this scenario, the network device can schedule the PUSCH of the first uplink carrier of the second cell based on the sent second message, and receive the PUSCH sent by a terminal device. This effectively reduces control signaling overheads, meets diversified scheduling requirements, and implements communication diversity and system effectiveness.

For example, the PDSCH includes a first PDSCH and a second PDSCH, the first PDSCH corresponds to the first cell, and the second PDSCH corresponds to the second cell.

For example, the PDSCH includes a third PDSCH, and the third PDSCH corresponds to the first cell and the second cell.

With reference to the second aspect, in some implementations of the second aspect, the sending a second message includes: sending the second message on the second downlink carrier of the second cell; sending the second message on the first downlink carrier of the first cell; or sending the second message on a third downlink carrier of a third cell.

For example, when this carrier supports scheduling of a PUSCH, the network device may further send DCI on a third downlink carrier of the second cell, where the DCI indicates scheduling information corresponding to a PDSCH of the third downlink carrier of the second cell.

For example, the network device may further send DCI on a fourth downlink carrier of the second cell, where the DCI indicates the terminal device to schedule a PUSCH or a PDSCH of the second cell in a cross-carrier manner, and/or indicates the terminal device to jointly schedule a PDSCH of the second cell and a PDSCH of the third cell.

For example, when this carrier does not support scheduling of a PUSCH, the network device may further send DCI on a third downlink carrier of the first cell, where the DCI indicates the terminal device to schedule a PDSCH on the third downlink carrier of the first cell in a downlink cross-carrier manner.

For example, the network device may further send DCI on a fourth downlink carrier of the first cell, where the DCI indicates the terminal device to schedule a PUSCH or a PDSCH of the third cell in a cross-carrier manner, and/or indicates the terminal device to jointly schedule a PDSCH of the first cell and a PDSCH of the third cell in a downlink manner.

With reference to the second aspect, in some implementations of the second aspect, the method further includes: sending a third message on the first downlink carrier of the first cell, where the third message indicates a scheduling message of a third PDSCH of the first downlink carrier of the first cell or a scheduling message of a first PUSCH of a second uplink carrier of the first cell; sending first configuration information of the first cell, where the first configuration information of the first cell indicates a first search space, and the first search space is used for detecting the third message; and sending first configuration information of the second cell, where the first configuration information of the second cell indicates a second search space, and the second search space is used for detecting the first message.

With reference to the second aspect, in some implementations of the second aspect, the method further includes: sending second configuration information of the first cell, where the second configuration information of the first cell indicates a third search space, the third search space is used for detecting a fourth message and the first message, and the fourth message indicates scheduling information of a fourth PDSCH of the first downlink carrier of the first cell or scheduling information of a second PUSCH of a second uplink carrier of the first cell.

It should be understood that, in the foregoing possible implementation, there is a self-scheduling search space, and the first message may also be blindly detected in the self-scheduling search space.

With reference to the second aspect, in some implementations of the second aspect, the method further includes: sending second configuration information of the second cell, where the second configuration information of the second cell indicates a fourth search space, and the fourth search space is used for detecting the second message.

With reference to the second aspect, in some implementations of the second aspect, the method further includes: sending third configuration information of the second cell, where the third configuration information of the second cell indicates a fifth search space, and the fifth search space is used for detecting the first message.

It should be understood that, in the foregoing possible implementation, both search spaces for joint scheduling and uplink scheduling exist and are shared, that is, the terminal device may alternatively blindly detect the second message in the search space for joint scheduling.

With reference to the second aspect, in some implementations of the second aspect, the method further includes: sending fourth configuration information of the second cell, where the fourth configuration information of the second cell indicates a sixth search space, and the sixth search space is used for detecting the first message and the second message.

It should be understood that, in the foregoing possible implementation, there is a search space for joint scheduling, and the second message is also blindly detected in the search space for joint scheduling.

According to a third aspect, a communication device is provided, including: a transceiver unit, configured to receive a first message on a first downlink carrier of a first cell, where the first message indicates scheduling information of a physical downlink shared channel PDSCH, and the PDSCH corresponds to the first downlink carrier of the first cell and a second downlink carrier of a second cell. The transceiver unit is further configured to receive a second message, where the second message indicates scheduling information of a physical uplink shared channel PUSCH of a first uplink carrier of the second cell. The transceiver unit is further configured to send the PUSCH on the first uplink carrier of the second cell based on the second message.

For example, the PDSCH includes a first PDSCH and a second PDSCH, the first PDSCH corresponds to the first cell, and the second PDSCH corresponds to the second cell.

For example, the PDSCH includes a third PDSCH, and the third PDSCH corresponds to the first cell and the second cell.

With reference to the third aspect, in some implementations of the third aspect, the transceiver unit is further configured to: receive the second message on the second downlink carrier of the second cell; receive the second message on the first downlink carrier of the first cell; or receive the second message on a third downlink carrier of a third cell.

With reference to the third aspect, in some implementations of the third aspect, the transceiver unit is further configured to receive first configuration information of the first cell. The first configuration information of the first cell indicates a first search space. A processing unit is configured to detect a third message in the first search space. The third message indicates a scheduling message of a third PDSCH of the first downlink carrier of the first cell or a scheduling message of a first PUSCH of a second uplink carrier of the first cell. The transceiver unit is further configured to receive first configuration information of the second cell. The first configuration information of the second cell indicates a second search space. The processing unit is further configured to detect the first message in the second search space.

With reference to the third aspect, in some implementations of the third aspect, the processing unit is further configured to detect the first message in the first search space, where the first configuration information of the first cell is the same as the first configuration information of the second cell.

With reference to the third aspect, in some implementations of the third aspect, the transceiver unit is further configured to receive second configuration information of the first cell. The second configuration information of the first cell indicates a third search space. The processing unit is further configured to detect a fourth message in the third search space. The fourth message indicates a scheduling message of a third PDSCH of the first downlink carrier of the first cell or a scheduling message of a first PUSCH of a second uplink carrier of the first cell. The processing unit is further configured to detect the first message in the third search space.

With reference to the third aspect, in some implementations of the third aspect, the transceiver unit is further configured to receive second configuration information of the second cell. The second configuration information of the second cell indicates a fourth search space. The processing unit is further configured to detect the second message in the fourth search space.

With reference to the third aspect, in some implementations of the third aspect, the transceiver unit is further configured to receive third configuration information of the second cell. The third configuration information of the second cell indicates a fifth search space, and the fifth search space is used for detecting the first message. The processing unit is further configured to detect the second message in the fifth search space, where the second configuration information of the second cell is the same as the third configuration information of the second cell.

With reference to the third aspect, in some implementations of the third aspect, the transceiver unit is further configured to receive fourth configuration information of the second cell. The fourth configuration information of the second cell indicates a sixth search space, and the sixth search space is used for detecting the first message. The processing unit is further configured to detect the second message in the sixth search space.

According to a fourth aspect, a communication device is provided, including: a transceiver unit, configured to send a first message on a first downlink carrier of a first cell, where the first message indicates scheduling information of a physical downlink shared channel PDSCH, and the PDSCH corresponds to the first downlink carrier of the first cell and a second downlink carrier of a second cell. The transceiver unit is further configured to send a second message. The second message indicates scheduling information of a physical uplink shared channel PUSCH of a first uplink carrier of the second cell. The transceiver unit is further configured to receive the PUSCH on the first uplink carrier of the second cell based on the second message.

For example, the PDSCH includes a first PDSCH and a second PDSCH, the first PDSCH corresponds to the first cell, and the second PDSCH corresponds to the second cell.

For example, the PDSCH includes a third PDSCH, and the third PDSCH corresponds to the first cell and the second cell.

With reference to the fourth aspect, in some implementations of the fourth aspect, the transceiver unit is further configured to: send the second message on the second downlink carrier of the second cell; send the second message on the first downlink carrier of the first cell; or send the second message on a third downlink carrier of a third cell.

With reference to the fourth aspect, in some implementations of the fourth aspect, the transceiver unit is further configured to send a third message on the first downlink carrier of the first cell. The third message indicates a scheduling message of a third PDSCH of the first downlink carrier of the first cell or a scheduling message of a first PUSCH of a second uplink carrier of the first cell. The transceiver unit is further configured to send first configuration information of the first cell. The first configuration information of the first cell indicates a first search space, and the first search space is used for detecting the third message. The transceiver unit is further configured to send first configuration information of the second cell. The first configuration information of the second cell indicates a second search space, and the second search space is used for detecting the first message.

With reference to the fourth aspect, in some implementations of the fourth aspect, the transceiver unit is further configured to send second configuration information of the first cell. The second configuration information of the first cell indicates a third search space, the third search space is used for detecting a fourth message and the first message, and the fourth message indicates scheduling information of a fourth PDSCH of the first downlink carrier of the first cell or scheduling information of a second PUSCH of a second uplink carrier of the first cell.

With reference to the fourth aspect, in some implementations of the fourth aspect, the transceiver unit is further configured to send third configuration information of the second cell. The third configuration information of the second cell indicates a fifth search space, and the fifth search space is used for detecting the first message.

With reference to the fourth aspect, in some implementations of the fourth aspect, the transceiver unit is further configured to send fourth configuration information of the second cell. The fourth configuration information of the second cell indicates a sixth search space, and the sixth search space is used for detecting the first message and the second message.

According to a fifth aspect, a terminal device is provided, including a transceiver, a processor, and a memory. The processor is configured to control the transceiver to receive and send a signal. The memory is configured to store a computer program. The processor is configured to invoke the computer program from the memory and run the computer program, so that the terminal device performs the method in any one of the first aspect or the possible implementations of the first aspect.

Optionally, there are one or more processors, and there are one or more memories.

Optionally, the memory may be integrated with the processor, or the memory and the processor are separately disposed.

Optionally, the terminal device further includes a transmitter and a receiver.

According to a sixth aspect, a network device is provided, including a transceiver, a processor, and a memory. The processor is configured to control the transceiver to receive and send a signal. The memory is configured to store a computer program. The processor is configured to invoke the computer program from the memory and run the computer program, so that the network device performs the method in any one of the second aspect or the possible implementations of the second aspect.

Optionally, there are one or more processors, and there are one or more memories.

Optionally, the memory may be integrated with the processor, or the memory and the processor are separately disposed.

Optionally, the network device further includes a transmitter and a receiver.

According to a seventh aspect, a communication system is provided, including the terminal device and/or the network device.

In a possible design, the communication system may further include another device that interacts with the terminal device in the solutions provided in embodiments of this application.

In another possible design, the communication system may further include another device that interacts with the network device in the solutions provided in embodiments of this application.

According to an eighth aspect, a communication apparatus is provided, including a module or a unit configured to implement the method in any one of the first aspect or the possible implementations of the first aspect, or a module or a unit configured to implement the method in any one of the second aspect or the possible implementations of the second aspect.

In a design, the communication apparatus is a communication chip. The communication chip may include an input circuit or an interface configured to send information or data, and an output circuit or an interface configured to receive information or data.

In another design, the communication apparatus is a communication device (for example, a terminal device, a P-CSCF device, or a gateway device). The communication chip may include a transmitter configured to send information or data, and a receiver configured to receive information or data.

According to a ninth aspect, a computer-readable storage medium is provided. The computer-readable storage medium stores a computer program or code, and when the computer program or code is run on a computer, the computer is enabled to perform the method in any one of the first aspect or the possible implementations of the first aspect, and the method in any one of the second aspect or the possible implementations of the second aspect.

According to a tenth aspect, a chip is provided, including at least one processor. The at least one processor is coupled to a memory, the memory is configured to store a computer program, and the processor is configured to invoke the computer program from the memory and run the computer program, so that a communication apparatus on which the chip is installed performs the method in any one of the first aspect or the possible implementations of the first aspect, and the method in any one of the second aspect or the possible implementations of the second aspect.

The chip may include an input circuit or interface configured to send information or data, and an output circuit or interface configured to receive information or data.

According to an eleventh aspect, a computer program product is provided. The computer program product includes computer program code, and when the computer program code is run by a terminal device, the terminal device is enabled to perform the method in any one of the first aspect or the possible implementations of the first aspect, or when the computer program code is run by a network device, the network device is enabled to perform the method in any one of the second aspect or the possible implementations of the second aspect.

According to the solutions in embodiments of this application, physical downlink shared channels of a plurality of carriers can be scheduled by using one piece of downlink control information. This effectively reduces overhead costs of control signaling, meets diversified scheduling requirements, and implements communication diversity and system effectiveness. In addition, in a carrier aggregation scenario, joint PDSCH scheduling is configured for one carrier, and a design scheme of a search space for joint scheduling of the carrier is provided.

DETAILED DESCRIPTION OF ILLUSTRATIVE EMBODIMENTS

The following describes technical solutions of this application with reference to accompanying drawings.

The technical solutions of embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution-advanced LTE-A system, a universal mobile telecommunications system (UMTS), a worldwide interoperability for microwave access (WiMAX) communication system, a 5th generation (5G) system, or a new radio (NR) system.

For ease of understanding embodiments of this application, a communication system applicable to embodiments of this application is first described in detail with reference to FIG. 1.

Figure 1:
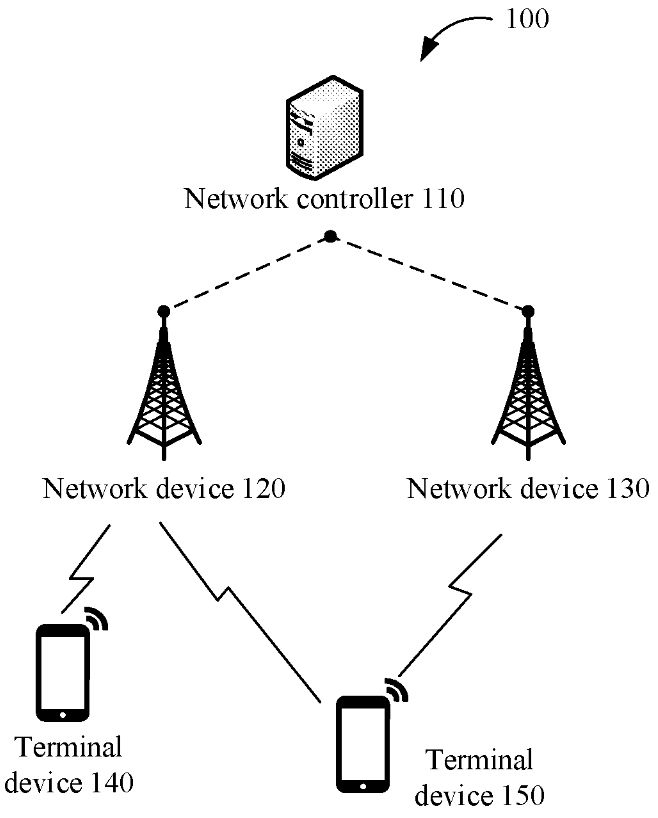
FIG. 1 is a schematic diagram of an example of a communication system applicable to this application.

FIG. 1 is a schematic diagram of a communication system 100 applicable to a channel resource transmission method in this application. As shown in FIG. 1, the communication system 100 includes a network controller 110, at least one network device (for example, a network device 120 and a network device 130), and at least one terminal device (for example, a terminal device 140 and a terminal device 150).

Specifically, the terminal devices 140 and 150 respectively access a wireless network by using the network devices 120 and 130. A wireless communication network may include a plurality of network devices that can support communication of a plurality of user equipments. The user equipment may communicate with the network device by using a downlink and an uplink. The downlink (or forward link) refers to a communication link from the network device to the user equipment, and the uplink (or reverse link) refers to a communication link from the user equipment to the network device. It should be understood that, in FIG. 1, that the system includes one network device is merely used as an example for description, but embodiments of this application are not limited thereto. For example, the system may alternatively include more network devices. Similarly, the system may alternatively include more terminal devices. It should be further understood that the system may also be referred to as a network. This is not limited in embodiments of this application.

The terminal device (for example, the terminal device 140 or the terminal device 150) in embodiments of this application may be mobile or fixed. The terminal device communicates with one or more core networks (CNs) by using a radio access network (RAN). The terminal device may be user equipment UE, an access terminal, a subscriber unit, a subscriber station, a mobile station, a remote station, a remote terminal, a mobile device, a user terminal, a terminal, a wireless communication device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA), a handheld device or computing device having a wireless communication function, another processing device connected to a wireless modem, a vehicle-mounted device, a wearable device, and a terminal device in a next-generation communication system, for example, a terminal device in a 5G network or a terminal device in a future evolved public land mobile network (PLMN). This is not limited in embodiments of this application.

The network device (for example, the network device 120 or the network device 130) in embodiments of this application may be a device configured to communicate with a terminal device. The network device may be a network device (Base Transceiver Station (BTS)) in a global system for mobile communications GSM or a code division multiple access CDMA system, or may be a network device (NodeB (NB)) in a wideband code division multiple access WCDMA system, or may be an evolved network device (evolved NodeB, eNB, or eNodeB) in an LTE system, or may be a radio controller in a cloud radio access network (CRAN) scenario, or the network device may be a relay station, an access point, a vehicle-mounted device, a wearable device, or a network device in a 5G system, for example, a transmission point (TP), a transmission reception point (TRP), a base station, a small cell device, or a network device in a future evolved public land mobile network PLMN. This is not limited in embodiments of this application.

In embodiments of this application, the network device 120 and the network device 130 may be controlled and/or scheduled by the network controller 110. The network controller 110 may perform, based on information obtained from each network device and maintained by the network controller 110, unified resource scheduling and management on a plurality of controlled network devices. For example, the network controller 110 sends control messages and/or indication information and the like to the plurality of controlled network devices.

It should be understood that the network controller 110 may be an independent physical device (as shown in FIG. 1), or may be a software and/or hardware functional module integrated into a network device. This is not particularly limited in this application.

In NR, a network device (for example, the network device 120) accessed by a terminal device (for example, the terminal device 140) for the first time is referred to as a serving network device. After being powered on, the terminal device 140 may select a suitable or acceptable cell through cell search, and then complete a connection to a network side through an attach procedure. After completing the attach procedure, the terminal device 140 may perform data communication with the network device 120.

It should be understood that FIG. 1 is merely a simplified schematic diagram of an example for ease of understanding. The communication system 100 may further include another network device and/or another terminal device that are/is not shown in FIG. 1.

Figure 2:
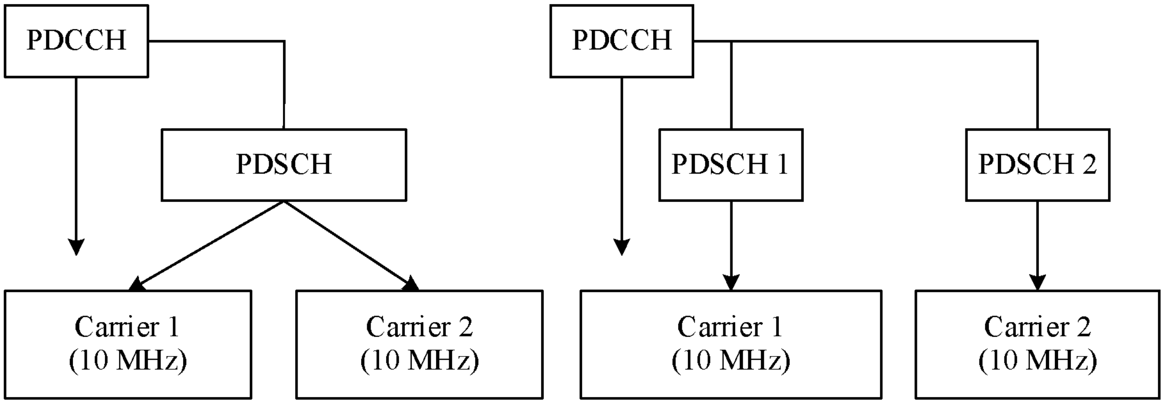
FIG. 2 is a schematic diagram of a carrier aggregation scenario applicable to this application.

It should be noted that the technical solutions in this application support the terminal device in effectively implementing diversified resource scheduling in a carrier aggregation scenario. FIG. 2 is a schematic diagram of a carrier aggregation scenario applicable to this application. As shown in FIG. 2, a network device may schedule a PDSCH of a plurality of aggregated carriers (for example, a carrier 1 and a carrier 2) by sending one piece of downlink control information DCI. The PDSCH corresponds to the carrier 1 and the carrier 2. The carrier 1 may be understood as a first downlink carrier of a cell #A, and the carrier 2 may be understood as a second downlink carrier of a cell #B. For example, the PDSCH includes a PDSCH 1 and a PDSCH 2, where the PDSCH 1 corresponds to the first downlink carrier of the cell #A, and the PDSCH 2 corresponds to the second downlink carrier of the cell #B. Alternatively, the PDSCH includes a PDSCH 3, where the PDSCH 3 corresponds to the first downlink carrier of the cell #A and the second downlink carrier of the cell #B. It should be understood that one cell includes at least one downlink carrier and zero, one, or more uplink carriers. An embodiment of this application is described in detail by using an example in which one cell includes one downlink carrier and one uplink carrier.

It should be understood that, before the network device and the terminal device perform data transmission, the terminal device may receive downlink control information DCI on a PDCCH, and receive downlink data on a physical downlink shared channel PDSCH based on an indication of the DCI, or send uplink data on a physical uplink shared channel PUSCH. A process in which the terminal device receives the DCI may be as follows: The network device configures a CORESET and a search space for the terminal device, and the terminal device blindly detects a candidate DCI format in the configured search space, and then performs a CRC check on the received DCI. If the CRC check succeeds, the terminal device decodes the DCI, and obtains DCI content.

However, in a carrier aggregation scenario, as control signaling overheads increase, when a joint-scheduling PDSCH is configured for one carrier, that is, one piece of DCI is sent on the first downlink carrier of the cell #A (or the second downlink carrier of the cell #B), the DCI indicates scheduling information of a PDSCH, and the PDSCH corresponds to the first downlink carrier of the cell #A and a second downlink carrier of the cell #B. How to implement a design of a search space for joint scheduling of the carrier and uplink scheduling of the carrier are not considered currently.

In view of this, this application provides a communication method, so that a terminal device can schedule downlink data of a plurality of carriers by using one piece of downlink control information in a carrier aggregation scenario, to reduce control signaling overheads, meet an uplink scheduling requirement of a carrier configured with a joint-scheduling PDSCH, and provide a solution for configuring and determining a search space for joint scheduling.

To better understand the technical solutions of this application, the following briefly describes some terms in this application.

1. Control Channel

The control channel in this application may be used to carry resource scheduling information and other control information. For example, the control channel may be a physical downlink control channel (PDCCH), an enhanced physical downlink control channel (ePDCCH), a new radio physical downlink control channel (NR-PDCCH), and other downlink channels that are defined with the evolution of a network and have the foregoing functions. For ease of description, the following uses only a PDCCH as an example to describe in detail the control channel transmission method in embodiments of this application. It should be understood that a channel may also be referred to as a signal or another name. This is not particularly limited in embodiments of this application.

For example, a physical downlink control channel PDCCH is used to carry downlink control information DCI. The PDCCH is mainly configured to: (1) send downlink scheduling information, which is also referred to as downlink (DL) assignment, so that UE receives a PDSCH; (2) send uplink scheduling information, which is also referred to as an uplink (UL) grant, so that the UE sends a PUSCH; (3) send an aperiodic channel quality indicator (CQI) reporting request; (4) notify a multicast control channel (MCCH) of a change; (5) send an uplink power control command; (6) feed back hybrid automatic repeat request (HARQ)-related information; (7) include a radio network temporary identifier (RNTI), where the identification information is implicitly included in a cyclic redundancy check (CRC); and the like.

It should be understood that DCI generally has a plurality of DCI formats, and each DCI format and specific information included in the DCI format vary with a function of the DCI format. The DCI may be scrambled by using a system information-radio network temporary identifier (SI-RNTI), a paging-radio network temporary identifier (P-RNTI), a random access-radio network temporary identifier (RA-RNTI), or the like, to indicate cell-level information, or may be scrambled by using a cell-radio network temporary identifier (C-RNTI), a configured scheduling-radio network temporary identifier (CS-RNTI), a semi persistent configured scheduling-radio network temporary identifier (SP CSI-RNTI), or the like, to indicate UE-level information. A cell may schedule a plurality of UEs simultaneously in an uplink and a downlink. To be specific, the cell may send a plurality of pieces of scheduling information in each scheduling time unit. Each piece of scheduling information is transmitted on an independent PDCCH. To be specific, the cell may simultaneously send a plurality of PDCCHs in one scheduling time unit.

2. Control Channel Element (CCE), Resource Element Group (REG), and Aggregation Level (AL):

The resource element group REG may be understood as a basic unit for performing physical resource allocation by downlink control signaling, and is used to define mapping from the downlink control signaling to a resource element (RE). For example, one CCE includes six REGs, and one REG corresponds to one resource block (RB), that is, one CCE is a continuous resource block including 72 REs.

Figure 3:
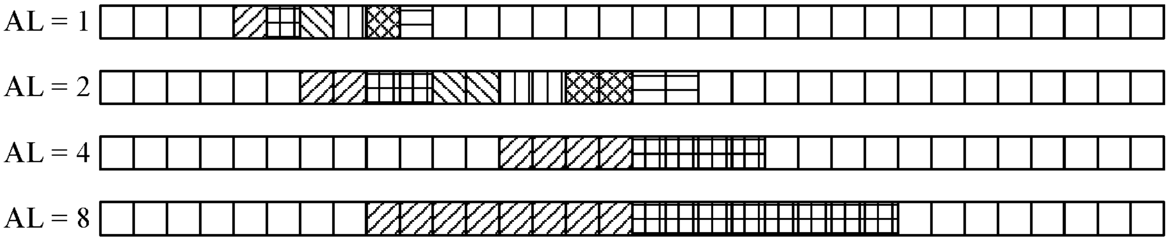
FIG. 3 is a schematic diagram of distribution of candidate locations of PDCCHs at different aggregation levels as specified in a current protocol.

It should be understood that a control area used to transmit a PDCCH is formed by logically-divided control channel elements CCEs. A basic unit of a time-frequency resource of DCI carried on the PDCCH is also a CCE. One PDCCH may be transmitted at different aggregation levels ALs, where the AL represents a quantity of CCEs included in the search space. For example, a value of AL may be 1, 2, 4, 8, or 16. A value of the aggregation level is not particularly limited in embodiments of this application. FIG. 3 is a schematic diagram of distribution of candidate locations of PDCCHs at different aggregation levels. As shown in FIG. 3, when AL=1, it indicates that DCI is carried on one CCE, a size of each search space is one CCE, a quantity of PDCCH candidates is 6, a size of the search space is six CCEs, the six CCEs are continuously distributed in a time-frequency resource, and so on. For brevity, this is not listed herein.

It should be noted that the search spaces at a same aggregation level that are shown in the figure correspond to different shadow areas, and each type of shadow indicates a candidate location of the PDCCH. For brevity, descriptions of a same or similar case are omitted below.

In addition, a network device can determine, based on factors such as channel quality, an aggregation level used by a PDCCH. For example, if a PDCCH is to be sent to UE with very good downlink channel quality (for example, the UE is located in a cell center), one CCE may be sufficient to send the PDCCH. If a PDCCH is to be sent to UE with very poor downlink channel quality (for example, the UE is located at a cell edge), eight CCEs or even 16 CCEs may be needed to send the PDCCH, to achieve sufficient robustness.

3. Carrier Aggregation

To meet requirements of single-user peak rate and system capacity improvement, a carrier aggregation technology is introduced in LTE-A to increase a system transmission bandwidth. Carrier aggregation is to aggregate two or more component carriers (CCs) together to obtain a larger transmission bandwidth. To ensure backward compatibility, a maximum bandwidth of each carrier is 20 MHz. A carrier to which the UE randomly accesses is referred to as a primary carrier component (PCC), a cell corresponding to the primary carrier component is a primary cell (PCell), and the primary cell maintains a radio resource control (RRC) connection to a terminal device. The primary cell may include one downlink carrier and one uplink carrier. A carrier other than the primary carrier component is referred to as a secondary carrier component (SCC), a cell corresponding to the secondary carrier component is a secondary cell (SCell), and is used to provide an additional radio resource. No RRC communication exists between the SCell and the terminal device. The secondary cell may include one downlink carrier.

It should be understood that the PCell is determined when a connection is established. The SCell is added, modified, or released by using an RRC connection reconfiguration message after an initial security activation procedure.

Actually, each component carrier corresponds to one independent cell, and one component carrier is usually equivalent to one cell. In embodiments of this application, meanings of a carrier and a component carrier may be understood as being the same. A CA function can support contiguous or non-contiguous carrier aggregation. To efficiently use fragmented spectrums, carrier aggregation supports aggregation of different component carriers, including aggregation of component carriers with the same or different bandwidths, aggregation of adjacent or non-adjacent component carriers in a same frequency band, and aggregation of component carriers in different frequency bands. That is, there may be three carrier aggregation scenarios, including: in-band contiguous carrier aggregation, in-band non-contiguous carrier aggregation, and out-of-band non-contiguous carrier aggregation.

4. Cross-Carrier Scheduling

Cross-carrier scheduling based on a carrier indicator field (CIF) supports scheduling of radio resources in another serving cell by using a PDCCH sent in a serving cell. That is, control information is transmitted on one component carrier (for example, a PDCCH), and a data channel resource corresponding to the control information is transmitted on another component carrier (for example, a PDSCH). That is, when cross-carrier scheduling is configured for a cell, a PDCCH cannot be sent in the cell, and downlink control information of the cell may be sent in another cell. That is, a base station schedules a corresponding resource in this cell by sending downlink control information in another cell.

Figure 4:
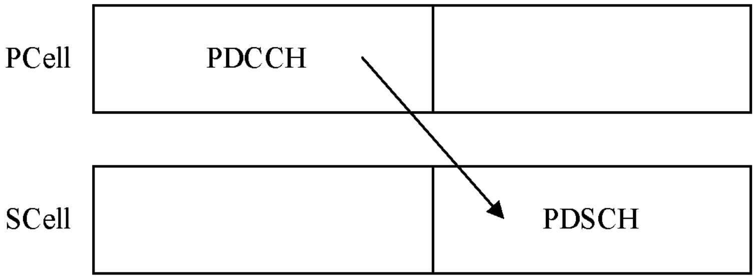
FIG. 4 is a schematic diagram of an example of cross-carrier scheduling applicable to this application.

It should be understood that FIG. 4 is a schematic diagram of an example of cross-carrier scheduling of an SCell by a PCell. As shown in FIG. 4, no PDCCH is configured on the SCell, control information is transmitted by using a PDCCH of the PCell, and corresponding data information is transmitted by using a PDSCH of the SCell. That is, the terminal device receives the control information on the PCell, to schedule a resource on the SCell.

5. Control Resource Set (CORESET)

A plurality of CORESETs may be configured for UE. The CORESET may include a time-frequency resource, and resource elements may be continuous or discontinuous in time-frequency domain. For example, each CORESET occupies an integer multiple of 6 RBs (72 subcarriers) in frequency domain, and each CORESET may be a quantity of time units in time domain, for example, a quantity of symbols in a subframe, a slot, or a mini-slot. Generally, {1, 2, and 3} symbols are occupied in time domain, and may be in any location of a slot. The terminal device may monitor a PDCCH on one or more CORESETs.

In embodiments of this application, for the network device, the CORESET may be understood as a resource occupied for sending a control channel. For the terminal device, a PDCCH search space of each terminal device belongs to the CORESET. In other words, the network device may determine, in the CORESET, a resource used to send the PDCCH, and the terminal device may determine the PDCCH search space based on the CORESET.

6. Search Space (SS)

As a search range of blind detection by the terminal device, the search space includes a common search space (CSS) and a UE-specific search space (USS). The common search space is used to transmit cell-level common information, for example, including control information related to paging, a random access response (RAR), and a broadcast control channel (BCCH). The information is the same for all user equipments and needs to be monitored. The UE-specific search space is used to transmit user equipment-level information, for example, user-level data scheduling and power control information scheduling. However, when the UE-specific search space does not have sufficient available resources, the common search space may also be used to transmit control information belonging to specific user equipment.

It should be understood that the search space may be re-divided or re-defined in this application. All resources used to transmit terminal device-level information may be defined as the UE-specific search space in embodiments of this application.

One search space is defined for a CCE aggregation level. One terminal device may have a plurality of search spaces, and CCEs in each search space may be continuously distributed. If carrier aggregation is configured for UE, the UE may monitor search space PDCCH candidate sets of all activated serving cells in each non-DRX subframe. This means that the terminal device needs to attempt to decode each PDCCH in the set based on a to-be-monitored DCI format. When sending a PDCCH including the carrier indicator field CIF, the network device knows a specific serving cell corresponding to the PDCCH, and also knows a PDCCH candidate set optional for the PDCCH. However, the UE is not sure about a specific CIF value included in the PDCCH, that is, the UE is not sure about which serving cell can send the PDCCH to the UE. The UE knows a CIF set that may be included on the PDCCH sent by each specific serving cell to the UE. Therefore, the UE may attempt to blindly detect the PDCCH with all possible CIF values on the serving cell. A search space $S_k^{(L)}$ at the aggregation levels AL=1, 2, 4, and 8 is defined as a PDCCH candidate set, and the set is referred to as a search space of the terminal device.

For example, Table 1 shows a correspondence among an aggregation level AL, a search space size, and a quantity $M^{(L)}$ of PDCCH candidates that need to be monitored in a given search space.

TABLE 1

| Search space $S_k^{(L)}$ | | | |
|---|---|---|---|
| Search space type | Aggregation level AL | Search space size | Quantity $M^{(L)}$ of PDCCH candidates |
| UE-specific search space (USS) | 1 | 6 | 6 |
| | 2 | 12 | 6 |
| | 4 | 8 | 2 |
| | 8 | 16 | 2 |
| Common search space (CSS) | 4 | 16 | 4 |
| | 8 | 16 | 2 |

It can be learned that different aggregation levels correspond to different search space sizes and different quantities of PDCCH candidates. In addition, the search space size $M=M^{(L)}\times L$. In other words, a quantity of CCEs included in the search space is a product of the aggregation level and the quantity of PDCCH candidates. PDCCHs sent by the network device to different user equipments may have different aggregation levels.

It should be understood that, for ease of understanding, Table 1 describes a correspondence among parameters with reference to the aggregation level AL, the search space size, and the quantity $M^{(L)}$ of PDCCH candidates that need to be monitored in the given search space that are defined in an LTE protocol. However, this should not constitute any limitation on embodiments of this application, and this application does not exclude a possibility of redefining a correspondence among the aggregation level AL, the search space size, and the quantity $M^{(L)}$ of PDCCH candidates that need to be monitored in the given search space in another protocol, and also does not exclude a possibility of defining more parameters.

It should be further understood that the common search space and the UE-specific search space may overlap, and UE-specific search spaces belonging to different user equipments may also overlap. If an overlapping area is occupied by one user equipment, other user equipments cannot use these CCE resources. During scheduling, the network device may select an available PDCCH candidate from a corresponding search space for each to-be-scheduled user equipment. If CCE resources can be allocated, the CCE resources are scheduled. Otherwise, the CCE resources are not scheduled.

It should be noted that the terminal device may determine a corresponding search space based on search space configuration information sent by the network device. For example, Table 2 shows parameters that may be included in configuration information of an associated search space and specific meanings of the parameters. In embodiments of this application, configuration information used to determine a search space includes at least one of the parameters in Table 2.

TABLE 2

| Parameter | Definition |
|---|---|
| Identifier of a search space set searchSpaceId | A maximum of 10 search spaces can be configured for each activated bandwidth part (BWP) |
| Control resource set index controlResourceSetId | When a value of a CORESET associated with the search space set is 0, it indicates that the search space is associated with a CORESET 0 configured by an MIB |
| Search space type search SpaceType | The search space type is CSS or USS, and a DCI format includes 0-0, 0-1, 1-0, 1-1, 2-0, 2-1, 2-2, and 2-3 |
| Quantity of candidate PDCCHs nrofCandidates | Aggregation degree information included in the search space set and a quantity of candidate PDCCHs in each aggregation degree |
| Monitoring periodicity and offset monitoringSlotPeriodicityAndOffset | Detect a periodicity (in a unit of slot) of the search space set and a slot offset of the search space from a start of the detection periodicity to actual detection |
| Duration duration | A quantity of slots in the search space set is continuously detected, and the quantity of slots needs to be less than the detection periodicity |
| Carrier group identifier CarriergroupID | An ID of a serving cell group associated with the search space, where each cell in the serving cell may be a jointly-scheduled cell |
| First symbol detected on a PDCCH firstSymbolsforPDCCHmonitoring | In each slot, a search space is associated with a start symbol location of time domain orthogonal frequency division multiplexing (OFDM) of the CORESET |

That the terminal device determines a search space PDCCH mainly includes: determining a CORESET, determining a searchSpaceId, and determining a start CCE location and an end CCE location that are corresponding to a PDCCH candidate. A possible implementation step may include: First, a case of a candidate PDCCH is determined based on a current search space and a configuration of an associated CORESET. A time domain start symbol location is determined based on a current search space configuration, and a quantity of time domain symbols is determined based on the CORESET associated with the search space. Then, a CCE index (that is, a start location of a CCE and a quantity of CCEs) of each candidate PDCCH in the CORESET is determined based on the current search space and the configuration of the associated CORESET. The CCE is specifically determined by using a search space function. Finally, UE can identify DCI of the UE by performing a CRC blind detection attempt on a listening location.

When configuring the search space, the terminal device configures a quantity of PDCCH candidates corresponding to each PDCCH aggregation level. The terminal device can determine a location of each PDCCH candidate based on at least one of the following formulas:

$$y_1 = L\cdot\left\{\left(Y_{p,n^{\mu}} + \left\lfloor\frac{m_{s,n_{CI}}\cdot N_P}{L\cdot M_s^L}\right\rfloor + n_{CI}\right)\lfloor N_P/L\rfloor\right\} + i, \text{ or}$$

$$y_2 = L\cdot\left\{\left(Y_{p,n^{\mu}} + \left\lfloor\frac{m_{s,n_{CID}}\cdot N_P}{L\cdot M_s^L}\right\rfloor + n_{CID}\right)\lfloor N_P/L\rfloor\right\} + i.$$

For any common search space, $$Y_{p,n^{\mu}_{s,f}} = 0;$$

and for the UE-specific search space, $$Y_{p,n^{\mu}_{s,f}} = \left(A_p\cdot Y_{p,n^{\mu}_{s,f}} - 1\right)\text{mod}D,$$

$Y_{p,-1}=n_{RNTI}\neq 0$, and $A_p=39827$. If p mod 3=0, $A_p=39829$; if, p mod 3=1, $A_p=39839$; if p mod 3=2, D=65537; and i=0, . . . , L−1, where p is an ID of a COERSET, s is an ID of a search space, L is an aggregation level, $$n^{\mu}_{s,f}$$

is a slot number, $m_{s,n_{CI}}$ is a PDCCH candidate number, $N_{CCE,p}$ is a quantity of CCEs in the COERSET p, and numbers range from 0 to $N_{CCE,p}-1$.

It should be understood that $n_{CI}$ is a carrier indicator field. If cross-carrier scheduling is configured for a carrier, $n_{CI}$ is an integer greater than zero; otherwise, $n_{CI}=0$. If joint scheduling is configured for a carrier, $n_{CI}$ is a carrier indicator field associated with a search space for joint scheduling, and the indicator field is used to identify the search space for joint scheduling. Herein, $n_{CID}$ is an identifier of a serving cell group, and represents an ID of a serving cell group associated with the search space, where each cell in the serving cell may be a jointly-scheduled cell. In addition, $$m_{s,n_{CI}} = 0, \ldots, M^{(L)}_{s,n_{CI}} - 1,$$

where $$M^{(L)}_{s,n_{CI}}$$

is a quantity of PDCCH candidates corresponding to an aggregation level L, and $$M^{(L)}_{s,n_{CI}}$$

is a search space associated with a serving cell.

For the common search space, $$M_{s,max}^{(L)} = M_{s,0}^{(L)};$$

and for the UE-specific search space, $$M_{s,max}^{(L)}$$

is a maximum value in all quantities of PDCCH candidates corresponding to the CCE aggregation level L corresponding to the search space in $n_{CI}$; and $n_{RNTI}$ is a value of a C-RNTI.

7. PDCCH Blind Detection

Because the PDCCH is an instruction sent by the network device, and the UE has not received other information except some system information, the UE does not know a quantity, locations, or DCI formats of control channel elements CCEs occupied by the UE, and does not know a DCI aggregation level. Therefore, in the common search space or the UE-specific search space, the UE may use different ALs to blindly detect all PDCCH candidates in the search space based on an expected DCI format. That is, the UE detects, in a blind detection manner, a downlink control channel PDCCH sent by the network device, to obtain downlink control information DCI, and process a corresponding data service.

Although the UE does not know in advance a specific format of DCI included in a to-be-received PDCCH, and does not know a specific PDCCH candidate used to transmit the DCI, the UE knows a state in which the UE is and DCI information expected to be received in this state. For example, the UE expects to receive a paging message when the UE is in an idle IDLE state, expects an RAR after the UE initiates a random access, and expects a UL grant or the like when there is uplink data to be sent.

The UE knows a search space of the UE, and therefore knows CCEs on which the DCI may be distributed. For different expected information, the UE attempts to perform a CRC check with a CCE in the search space of the UE by using a corresponding radio network temporary identifier, a possible DCI format, and a possible aggregation level AL. If the CRC check succeeds, the UE knows that the information is required by the UE, and knows a corresponding DCI format, to further decode DCI content.

For example, the UE does not know a specific aggregation level used for a PDCCH to be received, and therefore the UE may try all possibilities. For example, for the common search space, the UE may search based on Aggregation Level=4 and Aggregation Level=8 separately. When AL=4 is used for blind detection, 16 CCEs need to be blindly detected for four times, that is, there are four PDCCH candidates. When AL=8 is used for blind detection, 16 CCEs need to be blindly detected twice, that is, there are two PDCCH candidates. For the common space, there are 4+2=6 PDCCH candidates in total. For the UE-specific search space, the UE needs to perform blind detection based on Aggregation Level=1, 2, 4, and 8. In this case, there are 6+6+2+2=16 PDCCH candidates in total.

It should be understood that the UE may blindly detect a PDCCH in a PCell and an activated SCell. In addition, a maximum quantity of times of blind detection performed by CA-enabled UE is 44+32×quantity of activated SCells. Blind detection is performed on the PCell for 44 times, and blind detection is performed on the SCell for 32 times because the SCell does not need to blindly detect the common search space.

When performing blind detection in the search space, the UE needs to attempt to decode a possible DCI format, and does not need to match all DCI formats. The possible DCI format depends on specific information that the UE expects to receive and a transmission mode. For example, if the UE expects to receive downlink data and use TM3, when decoding a PDCCH scrambled by using a C-RNTI, the UE may attempt to decode a DCI format 1A and a DCI format 2A by using a C-RNTI of the UE. If the UE expects to receive system information (SI) in the subframe simultaneously, the UE may attempt to decode the DCI format 1A and a DCI format 1C by using an SI-RNTI. More exactly, the UE attempts blind detection by using a valid payload length corresponding to the DCI format. Before successfully decoding the PDCCH, the UE may attempt to perform decoding on each possible PDCCH candidate. That is, terminal blind detection means that the UE first calculates a start location for blindly detecting a CCE based on a UE ID, a subframe number, and the like, and intercepts a guessed DCI length at the start location of the CCE for decoding. If a CRC of a decoded information bit is the same as a CRC included in a PDCCH, it is considered that an information bit carried by a current PDCCH is currently transmitted downlink control information DCI.

The following describes in detail the resource scheduling method provided in this application with reference to the accompanying drawings and embodiments.

It should be understood that embodiments are described in this application with reference to a cell. The cell may be a cell corresponding to a network device. The cell may belong to a macro network device, or may belong to a network device corresponding to a small cell. The small cell may include: a metro cell, a micro cell, a pico cell, a femto cell, and the like. These small cells have characteristics of small coverage and low transmit power, and are suitable for providing a high-speed data transmission service.

First, to better describe the technical solutions in this application, self-scheduling and downlink joint scheduling are defined. For example, the self-scheduling may be sending a message #A on a first downlink carrier of a cell #a, where the message #A indicates scheduling information of a PDSCH of the first downlink carrier of the cell #a, or indicates scheduling information of a PUSCH of a first uplink carrier of the cell #a. The downlink joint scheduling may be sending a message #B on a first downlink carrier of a cell #a or a second downlink carrier of a cell #b, where the message #B indicates scheduling information of a PDSCH, and the PDSCH corresponds to the first downlink carrier of the cell #a and the second downlink carrier of the cell #b. For example, the PDSCH may include a PDSCH #1 and a PDSCH #2. The PDSCH #1 corresponds to the first downlink carrier of the cell #a, and the PDSCH #2 corresponds to the second downlink carrier of the cell #b. Alternatively, the PDSCH may include a PDSCH #3, and the PDSCH #3 corresponds to the first downlink carrier of the cell #a and the second downlink carrier of the cell #b. It should be noted that a quantity of cells used for joint scheduling is not limited in this application. Joint scheduling of downlink data can reduce a quantity of times of blind detection of the terminal device and DCI overheads, thereby effectively improving carrier resource scheduling efficiency.

Optionally, downlink joint scheduling may further include sending a message #C on the first downlink carrier of the cell #a. The message #C indicates scheduling information of a PDSCH. The PDSCH may correspond to the first downlink carrier of the cell #a, the second downlink carrier of the cell #b, a third downlink carrier of a cell #c, and the like. It should be understood that a quantity of carriers used for joint scheduling is not limited in this application.

By way of example, and not limitation, the technical solutions provided in this application are applicable to a carrier aggregation scenario. It is assumed that activated cells of a terminal device include three cells: a cell Cell #A, a cell Cell #B, and a cell Cell #C. The cell Cell #A is a primary cell PCell, and the cell Cell #B and the cell Cell #C are respectively a secondary cell SCell 1 and a secondary cell SCell 2. The PCell and the SCell 1 support joint scheduling. The following uses an example in which the PCell schedules the SCell 1, that is, a message used for joint scheduling is sent on the PCell, to separately describe in detail, from three possible implementations, how to schedule a PUSCH of a first uplink carrier of the SCell 1, to reduce control signaling overheads, meet diversified scheduling requirements, and improve effectiveness of a communication system.

Figure 5:
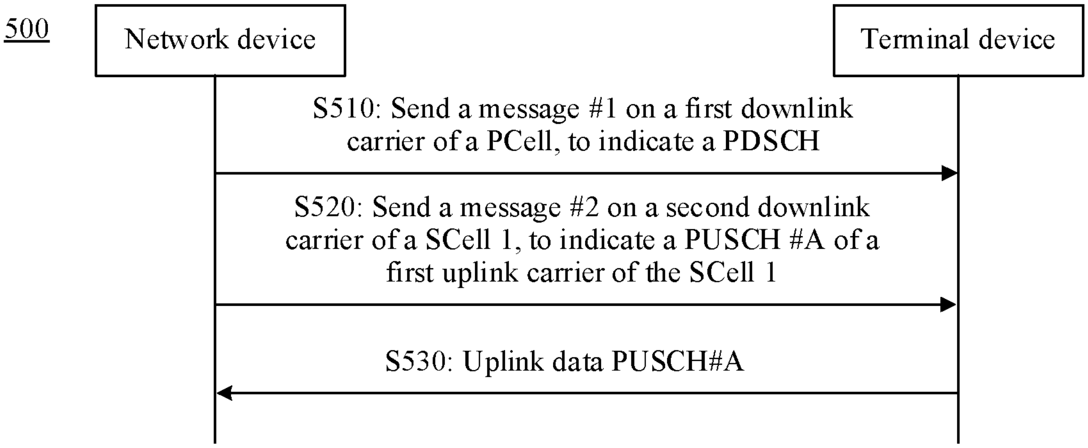
FIG. 5 is a schematic diagram of an example of a resource scheduling method applicable to this application.

Manner 1:

FIG. 5 is a schematic diagram of an example of a resource scheduling method applicable to this application.

It should be noted that, in this implementation, a rule may be predefined: The PCell and the SCell 1 support joint scheduling of the PDSCH, and the SCell 1 supports self-scheduling of the PUSCH. As shown in FIG. 5, the method 500 includes the following steps.

S510: A network device sends a message #1 to a terminal device on a first downlink carrier of a PCell (that is, an example of a first cell); and correspondingly, the terminal device receives the message #1 from the network device on the first downlink carrier of the PCell.

The message #1 indicates scheduling information of a PDSCH, and the PDSCH corresponds to the first downlink carrier of the PCell and a second downlink carrier of an SCell 1.

For example, the PDSCH may include a first PDSCH and a second PDSCH, where the first PDSCH corresponds to the PCell, and the second PDSCH corresponds to the SCell 1. Alternatively, the PDSCH may include a third PDSCH, where the third PDSCH corresponds to the PCell and the SCell 1. That is, the terminal device may receive, by receiving the message #1 from the network device, downlink data transmitted on the first downlink carrier of the PCell and the second downlink carrier of the SCell 1.

S520: The network device sends a message #2 to the terminal device on the second downlink carrier of the SCell 1 (that is, an example of a second cell); and correspondingly, the terminal device receives the message #2 from the network device on the second downlink carrier of the SCell 1.

The message #2 indicates scheduling information of a PUSCH of a first uplink carrier of the SCell 1. That is, the terminal device can obtain, by receiving the message #2 from the network device, scheduling information of a PUSCH #A on which the network device schedules the first uplink carrier of the SCell 1.

It should be noted that, before sending the scheduling information to the terminal device, the network device may send indication information #A to the terminal device in advance, to indicate that the terminal device is configured to jointly schedule a PDSCH for the PCell and the SCell 1 and supports uplink self-scheduling of the SCell 1 for the SCell 1, and notify or predefine that scheduling information used for joint scheduling is sent on the PCell, and scheduling information used for uplink scheduling is sent on the SCell 1. Optionally, the predefined rule further includes: After joint scheduling is configured for the terminal device, the terminal device may further receive scheduling information on the second downlink carrier of the SCell 1, where the scheduling information is used to schedule the PUSCH of the first uplink carrier of the SCell 1.

Correspondingly, after receiving the indication information #A, the terminal device may receive scheduling information #1 on the first downlink carrier of the PCell, where the scheduling information #1 is used to schedule a PDSCH #A of the first downlink carrier of the PCell and a PDSCH #B of the second downlink carrier of the SCell 1, or is used to schedule a PDSCH #C corresponding to the first downlink carrier of the PCell and the second downlink carrier of the SCell 1; or may receive scheduling information #2 on the second downlink carrier of the SCell 1, where the scheduling information #2 is used to schedule a PUSCH #A of the first uplink carrier of the SCell 1.

It should be understood that in the foregoing steps S510 and S520, the message #1 or the message #2 includes but is not limited to downlink control information DCI, uplink scheduling information, and the like.

By way of example, and not limitation, the network device may further send the message #1 or the message #2 to the terminal device on a PDCCH by using cell-specific or UE group-specific DCI, or send the message #1 or the message #2 to the terminal device by using UE-specific DCI.

Optionally, the terminal device may alternatively receive the message #1 or the message #2 in at least one of the following manners: RRC signaling, a media access control control element (MAC CE), physical layer signaling (for example, a PDCCH), and the like.

S530: The terminal device sends the PUSCH #A to the network device on the first uplink carrier of the SCell 1 based on the received message #2; and correspondingly, the network device receives the PUSCH #A from the terminal device on the first uplink carrier of the SCell 1.

In a possible implementation, the network device may further send a message #3 to the terminal device on the second downlink carrier of the SCell 1, to indicate scheduling information of the PDSCH #C of the second downlink carrier of the SCell 1.

In another possible implementation, the network device may further send a message #4 to the terminal device on the second downlink carrier of the SCell 1, to indicate the terminal device to schedule a PUSCH #B of a third uplink carrier of a SCell 2 or a PDSCH #D of a third downlink carrier of the SCell 2 in a cross-carrier manner; and/or indicate the terminal device to jointly schedule a PDSCH. The PDSCH corresponds to the second downlink carrier of the SCell 1 and the third downlink carrier of the SCell 2. For example, the PDSCH includes a PDSCH #E and a PDSCH #F, where the PDSCH #E corresponds to the SCell 1, and the PDSCH #F corresponds to the SCell 2. Alternatively, the PDSCH includes a PDSCH #G, and the PDSCH #G corresponds to the SCell 1 and the SCell 2.

For example, a transport block carried on a PDSCH scheduled by the network device is mapped to a physical resource block on a downlink activated bandwidth part BWP. If the physical resource block corresponds to a downlink carrier of a cell 1, the PDSCH corresponds to the cell 1. If the physical resource block corresponds to a downlink carrier of a cell 1 and a downlink carrier of a cell 2, the PDSCH corresponds to the cell 1 and the cell 2. In conclusion, in this possible implementation, the PUSCH of the first uplink carrier of the SCell 1 may be implemented by using self-scheduling of the SCell 1. That is, the network device sends the message #2 on the second downlink carrier of the SCell 1, to indicate the terminal device to self-schedule the PUSCH #A of the first uplink carrier of the SCell 1. The PDSCH of the second downlink carrier of the SCell 1 may be implemented by using downlink joint scheduling of the PCell or self-scheduling of the SCell 1. That is, the network device sends the message #3 on the third downlink carrier of the SCell 1, to indicate the terminal device to self-schedule the PDSCH #C of the second downlink carrier of the SCell 1; or sends the message #1 on the first downlink carrier of the PCell, to indicate the terminal device to schedule the PDSCH #B of the second downlink carrier of the SCell 1.

It should be understood that the foregoing embodiment of this application describes, for a case in which a plurality of cells (including at least the PCell and the SCell 1) are aggregated, how the network device effectively schedules the physical uplink shared channel PUSCH of the first uplink carrier of the SCell 1 based on the PDSCH of the SCell 1 implemented by using downlink joint scheduling of the PCell.

According to the solution provided in the foregoing embodiment, in a carrier aggregation scenario, the network device sends the message #1 on the first downlink carrier of the PCell, and the terminal device is supported to jointly schedule the PDSCH corresponding to the first downlink carrier of the PCell and the second downlink carrier of the SCell 1. In addition, the message #2 is sent on the second downlink carrier of the SCell 1, so that an uplink scheduling requirement of the first uplink carrier of the SCell 1 is effectively implemented, to reduce overhead costs of control signaling, and implement diversified scheduling requirements and effectiveness of a communication system.

By way of example, and not limitation, in the foregoing embodiment, when the PCell and the SCell 1 support joint scheduling, how to schedule uplink data of the SCell 1 is implemented. This technical solution is a further optimization policy in a joint scheduling scenario, and meets diversified scheduling requirements. Optionally, in this embodiment of this application, the technical solution of downlink joint scheduling and the technical solution of uplink scheduling of the SCell 1 may be decoupled, and the two solutions run independently. That is, the network device and the terminal device may receive and send downlink data based on that the PCell and the SCell 1 support downlink joint scheduling, which specifically corresponds to the foregoing step S510. For brevity, details are not described herein again.

Figure 6:
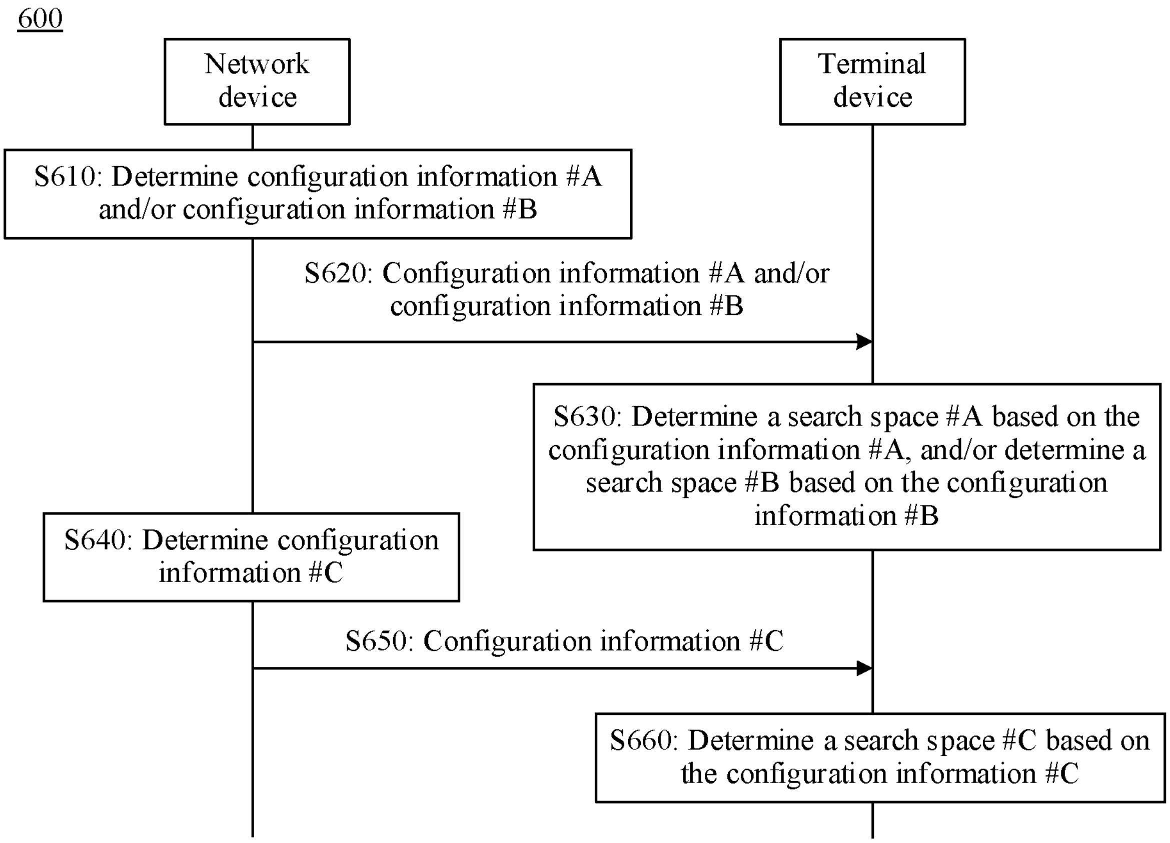
FIG. 6 is a schematic diagram of an example of determining a search space applicable to this application.

It should be specially noted that, in the foregoing possible implementation, downlink joint scheduling is configured for the SCell 1, and information transmission between the network device and the terminal device may include one of the following: self-scheduling of the PCell, downlink joint scheduling of the PCell, cross-carrier scheduling of the PCell, and self-scheduling of the SCell 1. Therefore, the terminal device may monitor, on the PCell based on configuration information, at least one of PDCCHs corresponding to self-scheduling of the PCell, cross-carrier scheduling of the PCell, and joint scheduling of the PCell, or may monitor, on the SCell 1, at least one of PDCCHs corresponding to self-scheduling of the SCell 1. FIG. 6 is a schematic diagram of an example in which a terminal device determines a search space of a PCell and an SCell 1. As shown in FIG. 6, the method 600 includes the following steps.

S610: A network device determines configuration information #A and/or configuration information #B.

The configuration information #A indicates a search space #A, represents a search space for self-scheduling a PDSCH and/or a PUSCH by a PCell, and is used to carry a message #5 of self-scheduling of the PCell. The configuration information #B indicates a search space #B, represents a search space for jointly scheduling the PDSCH by the PCell and an SCell 1, and is used to carry a message #1.

It should be noted that each set of search space configuration information includes at least one of a search periodicity, a quantity of time units that are continuously searched in each search periodicity, a monitoring occasion in the time unit, a control channel element CCE aggregation degree on each monitoring occasion, a potential transmission location of a physical downlink control channel PDCCH at each CCE aggregation degree, a downlink control information format DCI format, and a corresponding CORESET. The parameters in the search space configuration information and definitions of the parameters have been described in Table 2. Details are not described herein again.

In a possible implementation, if the configuration information #A and the configuration information #B are the same, the search space for self-scheduling of the PCell and a search space for downlink joint scheduling coexist and can be shared. In this case, from a perspective of signaling configuration, the configuration information #A includes at least configuration parameters of the associated PCell, and all the configuration parameters take effect. The configuration information #A may indicate the search space #A and the search space #B. In the configuration information #B, two parameters nrofCandidates and searchSpaceId are configurations of the associated SCell 1, and other parameters are corresponding PCell configurations.

Optionally, the network device determines the configuration information #A. The configuration information #A indicates the search space #A for self-scheduling of the PCell, and the configuration information #A is used to carry the message #5 for self-scheduling of the PCell. It should be understood that the search space #A is on the PCell. In addition, the network device and a terminal device may specify in a protocol, or the network device notifies the terminal device by using signaling, that the search space #A may also be used for blindly detecting the message #1. In this case, the search space #A for self-scheduling of the PCell exists, the network device does not need to determine the configuration information #B, and the search space for downlink joint scheduling and the search space for self-scheduling of the PCell are shared.

In another possible implementation, if the configuration information #A and the configuration information #B are different, the search space for self-scheduling of the PCell and a search space for downlink joint scheduling coexist and are mutually independent. In this case, from a perspective of signaling configuration, the configuration information #A includes at least configuration parameters of the associated PCell, and all the configuration parameters take effect. In the configuration information #B, two parameters nrofCandidates and searchSpaceId are associated SCell 1 configurations, and other parameters are corresponding PCell configurations. It should be understood that the configuration information #A and the configuration information #B are two sets of independent search space configurations.

For example, when the search space #B used for joint scheduling is determined, two parameters nrofCandidates and searchSpaceId in the configuration information #B take effect, and other configuration parameters do not take effect.

It should be noted that, if the PCell and the SCell 1 support joint scheduling, joint scheduling information may be sent on the PCell, or may be sent on the SCell. The network device may notify, by using signaling such as RRC signaling, UE to receive the joint scheduling information on a downlink carrier of a specific cell. Alternatively, the network device may notify, by using a predefined rule, UE to receive the joint scheduling information on a downlink carrier of a specific cell, for example, on a downlink carrier corresponding to a cell with a small cell index. After the UE determines the specific cell on which the joint scheduling information is received, a search space for joint scheduling determined by the UE is a search space on the cell. The search space may be determined based on a plurality of configuration parameters.

For example, after the UE determines that the joint scheduling information is sent on the PCell, the search space for joint scheduling determined by the UE is also on the PCell. It should be understood that the search space for self-scheduling of the PCell is also on the PCell. In this case, the search space for self-scheduling of the PCell may be shared with the search space for downlink joint scheduling.

Optionally, in another possible implementation, for downlink joint scheduling of the PCell, the network device may also add joint-scheduling search space configurations to the configuration information #B, that is, two new parameters nrofCandidates and searchSpaceId are directly configured in the configuration information #B, to indicate the search space #B.

Optionally, when joint scheduling is configured for different cells, a cell group number may be used to notify the UE. In this case, the terminal device may determine a search space for joint scheduling based on the cell group number. Correspondingly, the configuration information #B includes cell number information.

For example, it is assumed that the network device configures M cells for the terminal device, and activates N cells, where N is less than or equal to M. In addition, the network device may divide the M cells into K cell groups, and divide the N cells into L cell groups. UEs in the K cell groups may implement joint scheduling. In this case, the network device may notify, by using a cell group number 0 to K−1 and/or a cell group number 0 to L−1, the terminal device of cells that support joint scheduling. Optionally, the cell group number may be included or not included in the search space configuration information. Next, when determining the search space, the UE may correspond the cell group number to the formula for determining the CCE index, that is, $$y_2 = L \cdot \left\{ \left( Y_{p,n^{\mu}} + \left\lfloor \frac{m_{s,n_{CID}} \cdot N_P}{L \cdot M_s^L} \right\rfloor + n_{CID} \right) \lfloor N_p / L \rfloor \right\} + i.$$

S620: The network device sends configuration information #A and/or configuration information #B to the terminal device. Correspondingly, the terminal device receives the configuration information #A and/or the configuration information #B from the network device.

By way of example, and not limitation, the network device may send the configuration information #A and/or the configuration information #B to the terminal device by using broadcast signaling, RRC dedicated signaling, media access control MAC layer signaling, or physical layer signaling.

It should be noted that, before sending the search space configuration information to the terminal device, the network device may send the indication information #B to the terminal device in advance, to indicate a specific cell on which the terminal device next receives the search space configuration information. Generally, the terminal device may receive the indication information #B on the PCell. The indication information #B includes but is not limited to configuration information. For example, the terminal device may learn, by receiving the indication information #B, which serving cells are configured with downlink joint scheduling and which serving cells support uplink cross-carrier scheduling.

For example, after receiving the indication information #B, the terminal device learns that a joint-scheduling PDSCH is configured for the PCell and the SCell 1, and the predefined rule includes: The terminal device may receive scheduling information #1 on the first downlink carrier of the PCell, where the scheduling information #1 is used to schedule a PDSCH #A of the first downlink carrier of the PCell and a PDSCH #B of the second downlink carrier of the SCell 1, or is used to schedule a PDSCH #C corresponding to the first downlink carrier of the PCell and the second downlink carrier of the SCell 1; or may receive scheduling information #2 on the second downlink carrier of the SCell 1, where the scheduling information #2 is used to schedule a PUSCH #A of the first uplink carrier of the SCell 1.

Optionally, the predefined rule includes: After joint scheduling is configured for the terminal device, the terminal device may send a PDCCH on the second downlink carrier of the SCell 1 to implement self-scheduling.

In a possible implementation, the network device sends the configuration information #A to the terminal device. The configuration information #A indicates the search space #A for self-scheduling of the PCell, and the configuration information #A is used to carry the message #5 for self-scheduling of the PCell. It should be understood that the search space #A is on the PCell. In addition, the network device and the terminal device may specify in a protocol, or the network device notifies the terminal device by using signaling, that the search space #A may also be used for blindly detecting the message #1, that is, control information indicating downlink joint scheduling is also blindly detected in the search space #A.

S630: The terminal device determines the search space #A and/or the search space #B based on the received configuration information #A and/or configuration information #B.

In a possible implementation, if the configuration information #A and the configuration information #B are the same, that is, the search space for self-scheduling of the PCell and the search space for downlink joint scheduling coexist and can be shared, the terminal device may determine the search space #A and the search space #B based on the configuration information #A. It should be understood that the joint scheduling information is sent on the PCell, and the determined search space is also on the PCell. Therefore, both the search space #A and the search space #B are on the PCell. If the network device expects to jointly schedule a plurality of cells, the search space configuration information may be associated with one of the predefined cells, or may be associated with one of the indicated cells.

It should be understood that when determining the search space #A for self-scheduling of the PCell, the terminal device separately determines, based on the received configuration information #A associated with the PCell, a CORESET ID, a searchSpaceId, and a quantity of candidates corresponding to each CCE aggregation level, and determines, based on a configuration parameter and according to the foregoing formula for calculating a location of the PDCCH candidate, a CCE index corresponding to each PDCCH candidate, including a start index and an end index, so that the terminal device detects, in the determined PDCCH candidates, DCI used for PCell self-scheduling and downlink joint scheduling.

It should be further understood that when determining the search space #B used for joint scheduling, the terminal device determines, based on predefined or configured information, a cell on which the search space #B is located, and then determines the search space #B based on received configuration information associated with the cell. The configuration information includes the CORESET ID, the searchSpaceId, and the quantity of candidates corresponding to each CCE aggregation level. The associated configuration information may be configuration information of one cell, or may be configuration information of a plurality of cells. For example, downlink joint scheduling is configured for a cell 1 and a cell 2, and the search space #B is predefined or configured on a downlink carrier of the cell 1. In this case, a search space may be determined based on search space configuration information of the cell 1 or the cell 2, or the search space may be jointly determined based on search space configuration information of the cell 1 and the cell 2. For example, the search space configuration information includes a searchSpaceId in the search space configuration information of the cell 2, a quantity of candidates corresponding to each CCE aggregation level, and a CORESET ID corresponding to a same searchSpaceId on the cell 1 and the cell 2. Optionally, if downlink joint scheduling is configured for a cell and another cell, a cell group ID may be used for indication, and the cell group ID may be further included when the search space is determined.

Optionally, the terminal device determines the search space #A based on the configuration information #A, and the search space #A is used for blindly detecting the message #5 for self-scheduling of the PCell. It should be understood that the search space #A is on the PCell. In addition, the network device and the terminal device may specify in a protocol, or the network device notifies the terminal device by using signaling, that the search space #A may also be used for blindly detecting the message #1. In this case, the search space #A for self-scheduling of the PCell exists, and the terminal device may implement blind detection of downlink joint scheduling and PCell self-scheduling in the search space #A.

In another possible implementation, if the configuration information #A and the configuration information #B are different, that is, the search space for self-scheduling of the PCell and the search space for downlink joint scheduling coexist and are mutually independent, the terminal device may determine the search space #A based on the configuration information #A, and determine the search space #B based on the configuration information #B. In this case, because the joint scheduling information is sent on the PCell, and the determined search space is also on the PCell, both the search space #A and the search space #B are on the PCell.

S640: The network device determines configuration information #C.

The configuration information #C indicates a search space #C, represents a search space 1 for self-scheduling the PUSCH by the SCell 1, and is used to carry a message #2.

It should be noted that, if the search space #C is determined for use by the SCell 1 for self-scheduling the PUSCH, all configuration parameters in the configuration information #C take effect. An uplink scheduling DCI format includes a format 0_1.

S650: The network device sends the configuration information #C to the terminal device, and correspondingly, the terminal device receives the configuration information #C from the network device.

The configuration information #C includes at least configuration parameters of the associated SCell 1.

S660: The terminal device determines the search space #C based on the received configuration information #C.

It should be noted that a method for determining, by the terminal device, the search space #C for self-scheduling of the SCell 1 is the same as the method for determining the search space #A for self-scheduling of the PCell mentioned in step S630. For brevity, details are not described herein again.

For example, a quantity of search spaces in each search space is 10. That is, in a control resource set CORESET of a cell (for example, the PCell and the SCell 1) configured with joint scheduling, the network device may separately configure 10 searchSpaceIds for downlink joint scheduling, or may separately configure 10 searchSpaceIds for uplink scheduling of the SCell 1, or downlink joint scheduling and uplink scheduling of the SCell 1 share 10 searchSpaceIds.

For example, for the foregoing configuration manner, a possible configuration manner is as follows: When downlink joint scheduling is configured for the serving cell, searchSpaceId and nrofCandidates in searchspaceforcombination take effect. The CORESET ID is a CORESET ID corresponding to a same searchSpaceId on a cell that sends joint scheduling DCI.

By way of example, and not limitation, when the terminal device configures joint scheduling, there are at least two cells (for example, the PCell and the SCell 1) that support joint scheduling. The configuration information for determining the search space for joint scheduling may be associated with any serving cell, that is, the configuration information may be included in configuration information of any cell. For example, if joint scheduling is configured for the PCell and the SCell 1, the configuration information for determining the search space for joint scheduling may be associated with the PCell, or associated with the SCell 1, or associated with a scheduled cell, or associated with the cell that sends joint scheduling DCI, or associated with a serving cell with a highest/lowest index in jointly-scheduled cells. This is not limited in this application. It should be noted that the associated cell corresponds to $n_{CI}$ in the formula for determining the location of each PDCCH candidate.

Optionally, in the manner provided above, the search space of the PCell and the search space of the SCell 1 may be determined by the terminal device according to a predefined rule. Alternatively, the network device may determine the search space of the PCell and the search space of the SCell 1, and notify the terminal device by using broadcast signaling, RRC dedicated signaling, media access control MAC layer signaling, physical layer signaling, or the like. This is not limited in this application.

By way of example, and not limitation, in the foregoing embodiment, the search space for uplink scheduling of the SCell 1 is further determined based on the determined search space for downlink joint scheduling. Optionally, in this embodiment of this application, the technical solution of determining the search space for joint scheduling and the technical solution of determining the search space for uplink scheduling may be decoupled, and the two solutions run independently. That is, based on that the PCell and the SCell 1 support downlink joint scheduling, the network device may determine configuration information of a search space for joint scheduling, and send the configuration information to the terminal device. Alternatively, the terminal device may determine the corresponding search space based on the configuration information. This specifically corresponds to the foregoing steps S610 to S630. For brevity, details are not described herein again. It should be noted that a PDCCH monitoring occasion is a time unit used to monitor a PDCCH, and a related parameter is provided in a search space configuration. The PDCCH monitoring occasion is determined based on three parameters: a PDCCH monitoring periodicity, a PDCCH monitoring offset, and a PDCCH monitoring mode.

Figure 7:
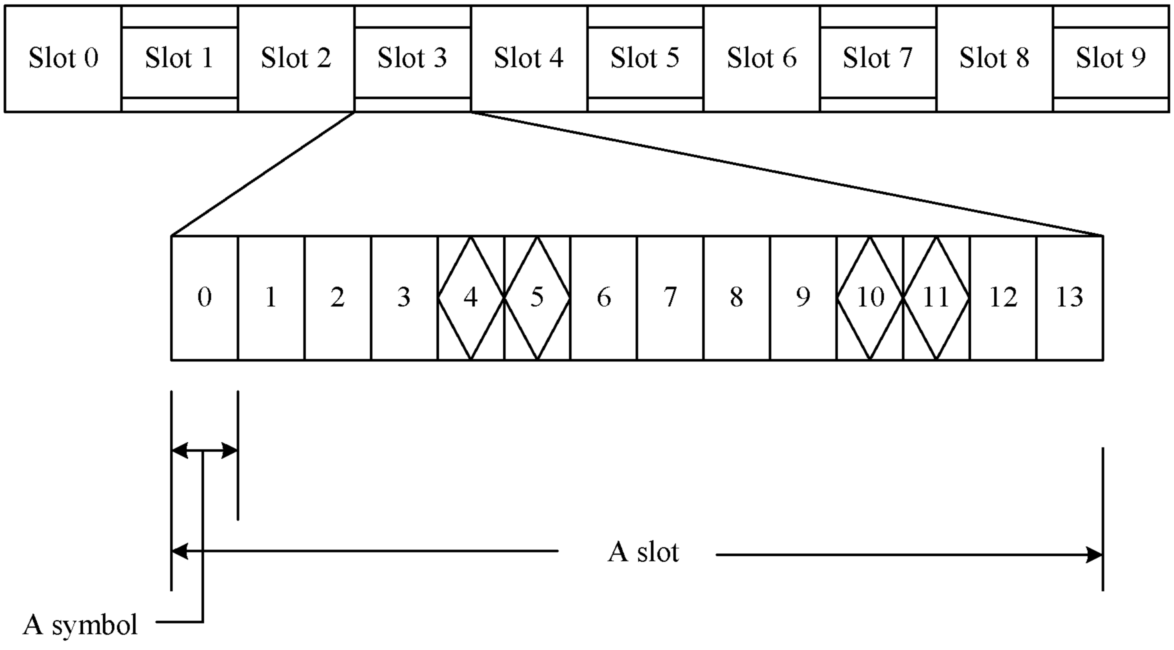
FIG. 7 is a schematic diagram of an example of determining a PDCCH monitoring occasion applicable to this application.

For example, FIG. 7 is a schematic diagram of an example of determining a PDCCH monitoring occasion. As shown in FIG. 7, it is assumed that a PDCCH monitoring periodicity is two slots, a slot offset value is 0, a quantity of time domain symbols of a CORESET associated with a search space is 1, and symbol locations are 4, 5, 10, and 11. In the PDCCH monitoring mode, a 14-bit bitmap configuration indicates a location of a symbol that needs to be monitored. In this figure, the 14-bit indication is a binary number (00001100001100), and each bit represents a location of a symbol, where 1 indicates that the symbol needs to be monitored, and 0 indicates that the symbol does not need to be monitored. Therefore, in this configuration, the terminal device may detect a candidate PDCCH in sym4, sym5, sym10, and sym11 in a second slot of each detection periodicity.

Figure 8:
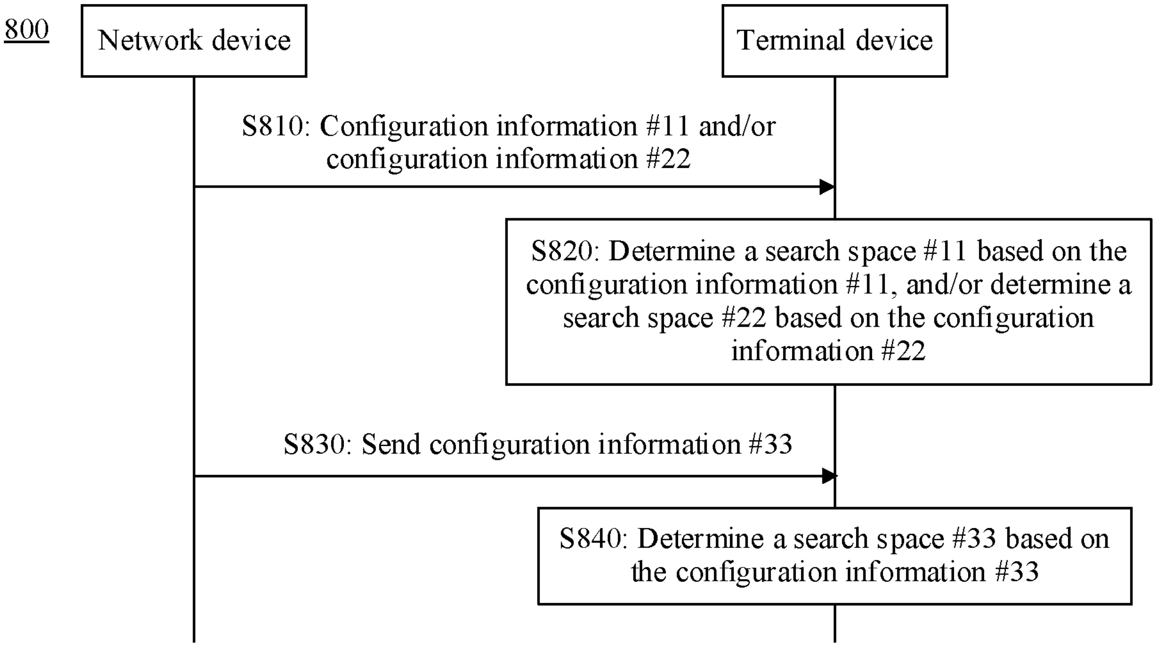
FIG. 8 is a schematic diagram of another example of determining a search space applicable to this application.

By way of example, and not limitation, for a search space determining method, this application further provides another possible implementation. FIG. 8 is a schematic diagram of an example in which a terminal device determines a search space for downlink joint scheduling and uplink scheduling of an SCell 1. As shown in FIG. 8, the method 800 includes the following steps.

S810: A network device sends configuration information #11 and/or configuration information #22 to a terminal device, and correspondingly, the terminal device receives the configuration information #11 and/or the configuration information #22 from the network device.

The configuration information #11 indicates a search space #11, and the search space #11 represents a search space for self-scheduling of a PCell. The configuration information #22 indicates a search space #22, and the search space #22 represents a search space for joint downlink scheduling of the PCell and an SCell 1.

It should be understood that the configuration information #11 includes at least configuration parameters of the associated PCell, two parameters nrofCandidates and searchSpaceId in the configuration information #22 are configurations of the associated SCell 1, and other parameters are configurations of the corresponding PCell.

S820: The terminal device determines the search space #11 based on the configuration information #11, and/or determines the search space #22 based on the configuration information #22.

The search space #11 is used to carry a message #11, and the message #11 indicates a PDSCH #11 of the PCell or a PUSCH #11 of the PCell. The search space #22 is used to carry a message #22, and the message #22 indicates a PDSCH #22 of the PCell and a PDSCH #33 of the SCell 1.

In a possible implementation, a rule may be predefined: A search space is shared for self-scheduling of the PCell and downlink joint scheduling. For example, there is a search space for self-scheduling of the PCell, and the terminal device may detect the message #22 in the search space #11. In other words, the terminal device detects, in the search space #11 for self-scheduling of the PCell, the message #22 indicating joint downlink scheduling. Alternatively, a search space for self-scheduling of the PCell and a search space for downlink joint scheduling coexist, and the message #22 may also be detected in the search space #11.

In another possible implementation, a rule may be further predefined: A search space for self-scheduling of the PCell and a search space for downlink joint scheduling coexist and are mutually independent. For example, the terminal device detects the message #11 in the search space #11 for self-scheduling, and detects the message #22 in the search space #22 for joint scheduling.

It should be understood that implementations of steps S810 and S820 are the same as those of steps S620 and S630. For brevity, details are not described herein again.

S830: The network device sends configuration information #33 to the terminal device, and correspondingly, the terminal device receives the configuration information #33 from the network device.

The configuration information #33 indicates a search space #33, and the search space #33 represents a search space for uplink scheduling of the SCell 1, and is used to carry a message #33. The message #33 indicates a PUSCH #22 of a first uplink carrier of the SCell 1.

S840: The terminal device determines the search space #33 based on the configuration information #33.

The search space #33 is used for detecting DCI #33.

It should be noted that a method for determining, by the terminal device, the search space #33 for self-scheduling of the SCell 1 is the same as the method for determining the search space #11 for self-scheduling of the PCell mentioned in step S630. For brevity, details are not described herein again.

According to the foregoing technical solutions, a joint scheduling method is designed, so that when joint PDSCH scheduling is configured for a carrier in a carrier aggregation scenario, a search space for joint scheduling of the carrier is configured and determined, and an uplink scheduling requirement of the carrier is implemented. This effectively reduces overhead costs of control signaling, and implements diversified scheduling requirements and effectiveness of a communication system.

Manner 2

Figure 9:
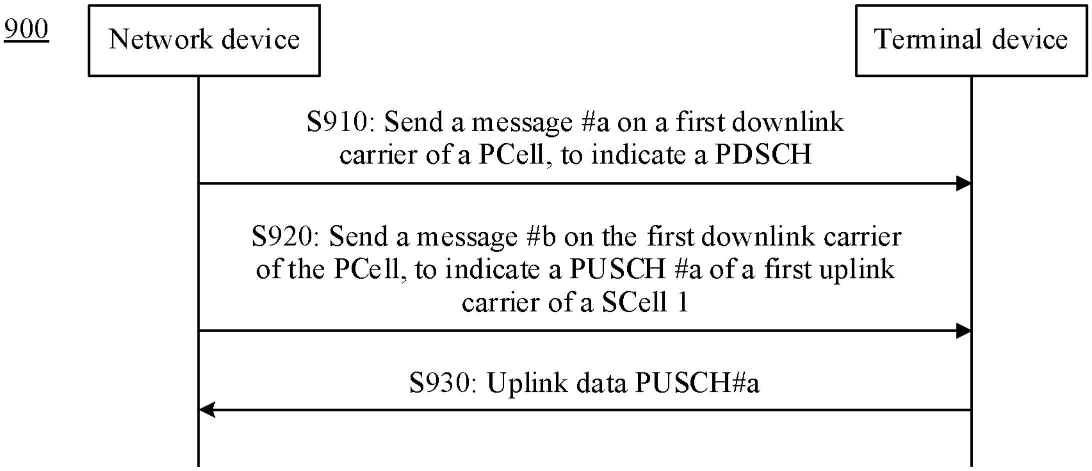
FIG. 9 is a schematic diagram of another example of a resource scheduling method applicable to this application.

FIG. 9 is a schematic diagram of another example of a resource scheduling method applicable to this application. A difference from Manner 1 lies in that a PUSCH on a first uplink carrier of an SCell 1 supports uplink cross-carrier scheduling by a PCell. To be specific, no PDCCH is configured on the SCell 1, control information is transmitted by using a PDCCH of the PCell, and corresponding data information is transmitted by using a PDSCH of the SCell 1. That is, a terminal device receives control information on the PCell, to schedule a resource on the SCell 1.

It should be noted that, in this implementation, a rule may be predefined: The PCell and the SCell 1 support joint scheduling of the PDSCH, and the SCell 1 supports uplink cross-carrier scheduling of the PUSCH. As shown in FIG. 9, the method 900 includes the following steps.

S910: A network device sends a message #a to a terminal device on a first downlink carrier of a PCell (that is, an example of a first cell); and correspondingly, the terminal device receives the message #a from the network device on the first downlink carrier of the PCell.

The message #a indicates scheduling information of a PDSCH, and the PDSCH corresponds to the first downlink carrier of the PCell and a second downlink carrier of an SCell 1.

For example, the PDSCH may include a first PDSCH and a second PDSCH, where the first PDSCH corresponds to the PCell, and the second PDSCH corresponds to the SCell 1. Alternatively, the PDSCH may include a third PDSCH, where the third PDSCH corresponds to the PCell and the SCell 1. That is, the terminal device may receive, by receiving the message #a from the network device, downlink data transmitted on the first downlink carrier of the PCell and the second downlink carrier of the SCell 1.

For example, by receiving the message #a sent by the network device, the terminal device can schedule a PDSCH #a of the first downlink carrier of the PCell and a PDSCH #b of the second downlink carrier of the SCell 1.

S920: The network device sends a message #b to the terminal device on the first downlink carrier of the PCell; and correspondingly, the terminal device receives the message #b from the network device on the first downlink carrier of the PCell.

The message #b indicates scheduling information of a PUSCH of a first uplink carrier of the SCell 1 (that is, an example of a second cell). That is, the terminal device can obtain, by receiving the message #b, scheduling information of a PUSCH #a on which the network device schedules the first uplink carrier of the SCell 1.

It should be noted that, before sending the scheduling information to the terminal device, the network device may send indication information #C to the terminal device in advance, to indicate that the terminal device is configured with downlink joint scheduling of the PCell and the SCell 1 and supports uplink cross-carrier scheduling of the PCell for the SCell 1, and notify or predefine that scheduling information used for joint scheduling is sent on the PCell, and scheduling information used for uplink cross-carrier scheduling is also sent on the PCell. Optionally, the predefined rule includes: After joint scheduling is configured for the terminal device, the terminal device may further receive scheduling information #3 on the first downlink carrier of the PCell, where the scheduling information is used to schedule the PUSCH of the first uplink carrier of the SCell 1.

S930: The terminal device sends the PUSCH #a to the network device on the first uplink carrier of the SCell 1 based on the received message #b; and correspondingly, the network device receives the PUSCH #a from the terminal device on the first uplink carrier of the SCell 1.

In a possible implementation, the network device may further send a message #c to the terminal device on the first downlink carrier of the PCell, to indicate scheduling information of a PDSCH #c of the second downlink carrier of the SCell 1.

In another possible implementation, the network device may further send a message #d to the terminal device on the first downlink carrier of the PCell, to indicate scheduling information of a PUSCH #b of a third uplink carrier of an SCell 2 and/or scheduling information of a PDSCH #d of the third downlink carrier of the SCell 2; or to jointly schedule PDSCHs of a plurality of cells such as the PCell, the SCell 1, and the SCell 2.

In the foregoing possible implementation, because the SCell 1 supports cross-carrier scheduling, no PDCCH is configured on the second downlink carrier of the SCell 1, and the terminal device does not need to monitor the PDCCH of the SCell 1. In other words, the SCell 1 does not support self-scheduling of this carrier, and does not support cross-carrier scheduling of the SCell 1 and/or downlink joint scheduling of another cell, or the like.

It should be noted that, when the SCell 1 and the PCell support downlink joint scheduling and downlink cross-carrier scheduling of the PCell, the terminal device may separately schedule the PDSCH of the second downlink carrier of the SCell 1 by using two different DCI formats. Optionally, DCI sizes of the two formats are aligned during blind detection, or the two DCI formats cannot be blindly detected at the same time, to avoid a resource scheduling disorder. In addition, the network device may reduce a quantity of times of blind detection of the terminal device through RRC signaling semi-static configuration.

Similarly, DCI sizes for uplink cross-carrier scheduling and downlink cross-carrier scheduling of the PCell also need to be aligned during blind detection.

In conclusion, in this possible implementation, the PUSCH of the first uplink carrier of the SCell 1 may be implemented by using uplink cross-carrier scheduling of the PCell. That is, the network device sends the message #b on the first downlink carrier of the PCell, to indicate the terminal device to schedule the PUSCH #a of the first uplink carrier of the SCell 1 in a cross-carrier manner. The PDSCH of the second downlink carrier of the SCell 1 may be implemented by using downlink joint scheduling or cross-carrier scheduling of the PCell. That is, the network device sends the message #c on the first downlink carrier of the PCell, to indicate the terminal device to schedule the PDSCH #c of the second downlink carrier of the SCell 1 in a cross-carrier manner; or sends the message #a on the first downlink carrier of the PCell, to indicate the terminal device to jointly schedule the PDSCH #b of the second downlink carrier of the SCell 1. It is clear that, a cell for scheduling uplink or downlink data of the SCell 1 in a cross-carrier manner is the same as a cell for jointly scheduling downlink data of the SCell 1, and both are the PCell.

According to the solution provided in the foregoing embodiment, in a carrier aggregation scenario, the network device sends the message #a on the first downlink carrier of the PCell, and the terminal device is supported to jointly schedule the PDSCH of the PCell and the SCell 1. In addition, the message #b is sent on the first downlink carrier of the PCell, so that an uplink scheduling requirement of the first uplink carrier of the SCell 1 is effectively implemented, to reduce overhead costs of control signaling, and implement diversified scheduling requirements and effectiveness of a communication system.

By way of example, and not limitation, in the foregoing embodiment, when the PCell and the SCell 1 support joint scheduling, how to schedule uplink data of the SCell 1 is implemented. This technical solution is a further optimization policy in a joint scheduling scenario, and meets diversified scheduling requirements. Optionally, in this embodiment of this application, the technical solution of downlink joint scheduling and the technical solution of uplink scheduling of the SCell 1 may be decoupled, and the two solutions run independently. That is, based on that the PCell and the SCell 1 support downlink joint scheduling, the network device may determine configuration information of a search space for joint scheduling, and send the configuration information to the terminal device. Alternatively, the terminal device may determine the corresponding search space based on the configuration information. This specifically corresponds to the foregoing step S910. For brevity, details are not described herein again. It should be specially noted that, in the foregoing possible implementation, the terminal device may monitor, on the PCell, at least one of PDCCHs corresponding to self-scheduling of the PCell, cross-carrier scheduling of the PCell, and downlink joint scheduling. FIG.

Figure 10:
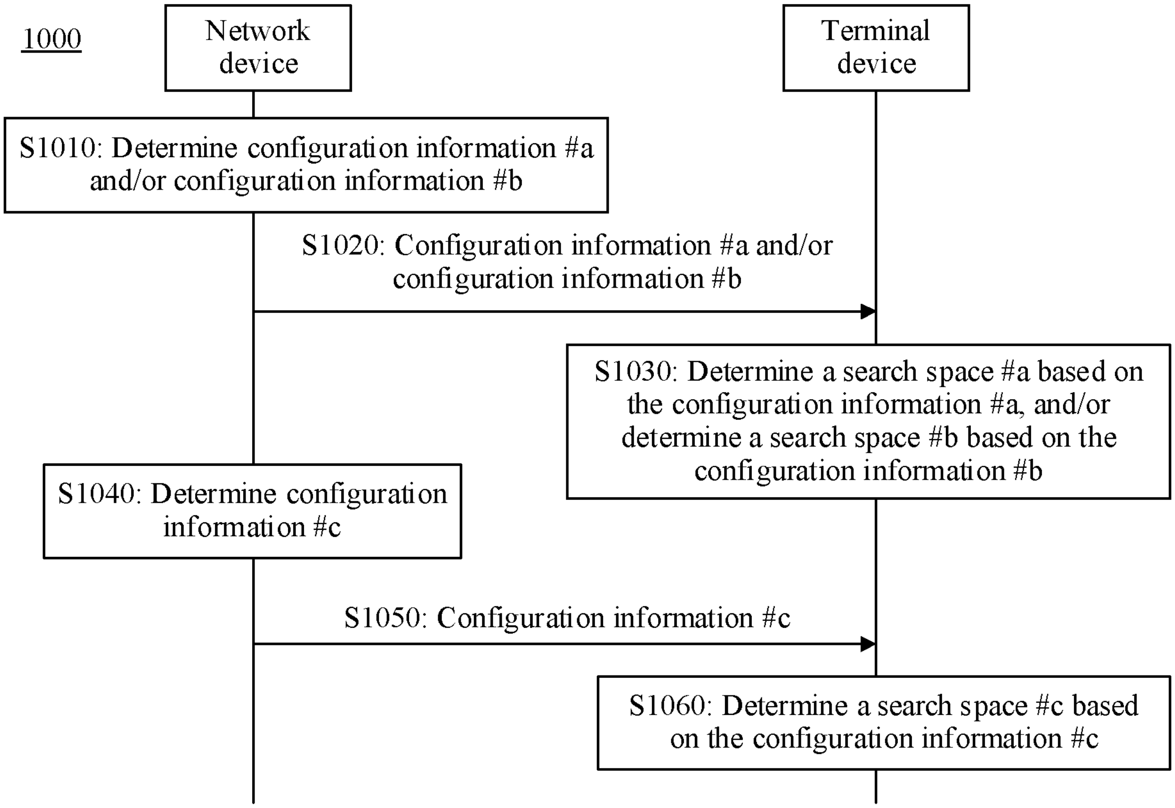
FIG. 10 is a schematic diagram of still another example of determining a search space applicable to this application.

10 is a schematic diagram of an example in which a terminal device determines a search space of a PCell. As shown in FIG. 10, the method 1000 includes the following steps.

S1010: A network device determines configuration information #a and/or configuration information #b.

The configuration information #a indicates a search space #a, represents a search space for self-scheduling a PDSCH and/or a PUSCH by a PCell, and is used to carry a message #e of self-scheduling of the PCell. The configuration information #b indicates a search space #b, represents a search space for jointly scheduling the PDSCH by the PCell and an SCell 1, and is used to carry a message #a.

It should be noted that, if the configuration information #a and the configuration information #b are the same, the search space for self-scheduling of the PCell and a search space for downlink joint scheduling may be shared; or if the configuration information #a and the configuration information #b are different, the search space for self-scheduling of the PCell and a search space for downlink joint scheduling coexist and are mutually independent. A related signaling configuration is similar to that in step S610. For brevity, details are not described herein again.

S1020: The network device sends the configuration information #a and/or configuration information #b to the terminal device, and correspondingly, the terminal device receives the configuration information #a and/or the configuration information #b from the network device.

S1030: The terminal device determines the search space #a and/or the search space #b based on the received configuration information #a and/or configuration information #b.

It should be noted that, if the configuration information #a and the configuration information #b are the same, the search space for self-scheduling of the PCell and the search space for downlink joint scheduling may be shared; or if the configuration information #a and the configuration information #b are different, the search space for self-scheduling of the PCell and the search space for downlink joint scheduling are mutually independent. The determining of the search space is similar to the foregoing step S630. For brevity, details are not described herein again.

It should be understood that, in this embodiment of this application, in a case in which the PCell schedules the SCell 1 in a cross-carrier manner, scheduling information used for self-scheduling of the PCell and cross-carrier scheduling of the SCell 1 is received and sent on the SCell 1. In this case, a search space for self-scheduling and/or joint scheduling determined by the UE is also on the SCell 1.

S1040: The network device determines configuration information #C.

The configuration information #c indicates a search space #c, represents a search space used by the PCell to schedule a PUSCH of a first uplink carrier of the SCell 1 in a cross-carrier manner, and is used to carry a message #b.

In a possible implementation, if the configuration information #b and the configuration information #c are the same, the search space for downlink joint scheduling and a search space for uplink scheduling of the SCell 1 coexist and can be shared. In this case, from a perspective of signaling configuration, two parameters nrofCandidates and searchSpaceId in the configuration information #b are configurations of the associated SCell 1, and other parameters are all configurations corresponding to the PCell. The configuration information #b may indicate the search space #b and the search space #c.

Optionally, the network device determines the configuration information #b. The configuration information #b indicates the search space #b for downlink joint scheduling, and the configuration information #b is used to carry the message #a for joint scheduling. It should be understood that the search space #b is on the PCell. In addition, the network device and the terminal device may specify in a protocol, or the network device notifies the terminal device by using signaling, that the search space #b may also be used for blindly detecting the message #b. In other words, the network device does not need to determine the configuration information #c, and the search space for uplink scheduling of the SCell 1 is shared with the search space for downlink joint scheduling.

In another possible implementation, if the configuration information #b and the configuration information #c are different, the search space for downlink joint scheduling and the search space for uplink scheduling of the SCell 1 coexist and are mutually independent. In this case, from a perspective of signaling configuration, the configuration information #b includes at least configuration parameters of the associated SCell 1: nrofCandidates1 and searchSpaceId 1, and other parameters are corresponding PCell configurations. The configuration information #c includes at least configuration parameters of the associated SCell 1: nrofCandidates2 and searchSpaceId 2. It should be understood that the configuration information #b and the configuration information #c are two sets of independent search space configurations.

For example, the network device may further configure a same valid parameter nrofCandidates2 in the configuration information #b and the configuration information #c, that is, downlink joint scheduling and uplink cross-carrier scheduling share a same nrofCandidates2. The network device may configure the parameter searchSpaceId in one set of configuration information (for example, the configuration information #b), and the other set of configuration information #c may be determined by using a predefined or notified offset value.

For example, the network device may jointly schedule a PDSCH for the PCell, configure a parameter searchSpaceId 1 in the configuration information #b, notify the terminal device of an offset value of the valid parameter searchSpaceId 2 in the configuration information #c relative to the valid parameter searchSpaceId 1 in the configuration information #b, and then obtain, through calculation according to a formula searchSpaceId 2=(searchSpaceId 1+offset) mode, that a maximum quantity of search spaces is the valid parameter searchSpaceId 2 in the configuration information #C.

S1050: The network device sends the configuration information #c to the terminal device, and correspondingly, the terminal device receives the configuration information #c from the network device.

The configuration information #c includes at least configuration parameters of the associated SCell 1.

S1060: The terminal device determines the search space #c based on the received configuration information #C.

In a possible implementation, if the configuration information #b and the configuration information #c are different, that is, the search space for downlink joint scheduling and the search space for uplink scheduling of the SCell 1 coexist and are mutually independent, the terminal device may determine the search space #b based on the configuration information #b, and determine the search space #c based on the configuration information #c.

By way of example, and not limitation, in the foregoing embodiment, the search space for uplink scheduling of the SCell 1 is further determined based on the determined search space for downlink joint scheduling. Optionally, in this embodiment of this application, the technical solution of determining the search space for joint scheduling and the technical solution of determining the search space for uplink scheduling may be decoupled, and the two solutions run independently. That is, based on that the PCell and the SCell 1 support downlink joint scheduling, the network device may determine configuration information of the search space for joint scheduling, and send the configuration information to the terminal device. Alternatively, the terminal device may determine the corresponding search space based on the configuration information. This specifically corresponds to the foregoing steps S1010 to S1030. For brevity, details are not described herein again.

According to the foregoing technical solutions, a joint scheduling method is designed, so that when joint PDSCH scheduling is configured for a carrier in a carrier aggregation scenario, a search space for joint scheduling of the carrier is configured and determined, and an uplink scheduling requirement of the carrier is implemented. This effectively reduces overhead costs of control signaling, and implements diversified scheduling requirements and effectiveness of a communication system.

Figure 11:
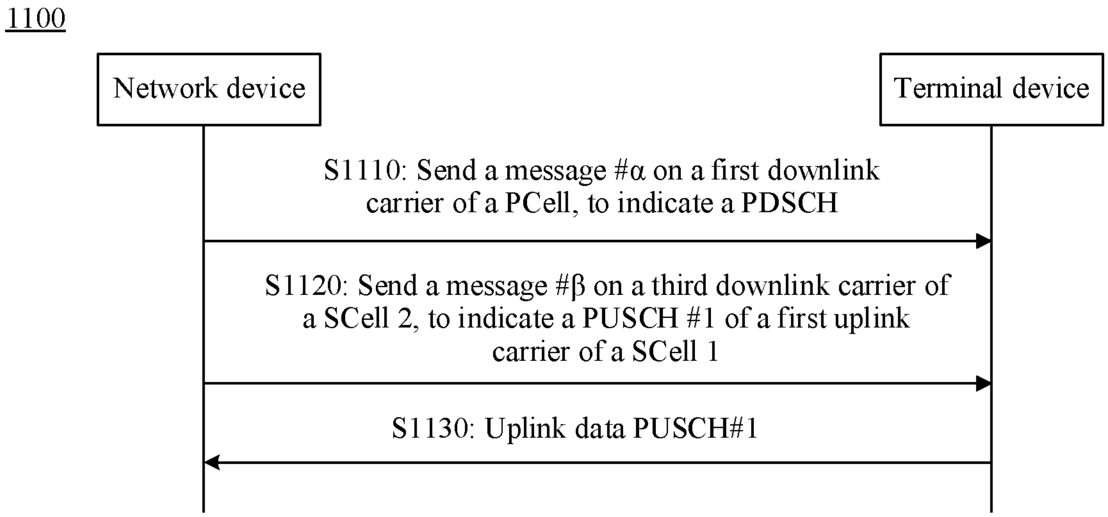
FIG. 11 is a schematic diagram of still another example of a resource scheduling method applicable to this application.

Manner 3:

FIG. 11 is a schematic diagram of another example of a resource scheduling method applicable to this application. A difference from Manner 1 lies in that a PUSCH on a first uplink carrier of an SCell 1 is scheduled by a SCell 2 in an uplink cross-carrier manner. To be specific, no PDCCH is configured on the SCell 1, control information is transmitted by using a PDCCH of the SCell 2, and corresponding data information is transmitted by using a PDSCH of the SCell 1. That is, a terminal device receives control information on the SCell 2, to schedule a resource on the SCell 1. It should be noted that, in this implementation, a rule may be predefined: A PCell and the SCell 1 support joint scheduling of the PDSCH, and the SCell 1 supports uplink cross-carrier scheduling of the PUSCH. As shown in FIG. 11, the method 1100 includes the following steps.

S1110: A network device sends a message #α to a terminal device on a first downlink carrier of a PCell (that is, an example of a first cell); and correspondingly, the terminal device receives the message #α from the network device on the first downlink carrier of the PCell.

The message #α indicates scheduling information of a PDSCH, and the PDSCH corresponds to the first downlink carrier of the PCell and a second downlink carrier of an SCell 1.

For example, the PDSCH may include a first PDSCH and a second PDSCH, where the first PDSCH corresponds to the PCell, and the second PDSCH corresponds to the SCell 1. Alternatively, the PDSCH may include a third PDSCH, where the third PDSCH corresponds to the PCell and the SCell 1. That is, the terminal device can schedule, by receiving the message #α from the network device, downlink data transmitted on the first downlink carrier of the PCell and the second downlink carrier of the SCell 1.

For example, the terminal device can schedule, by receiving the message #α sent by the network device, a PDSCH #1 of the first downlink carrier of the PCell and a PDSCH #2 of the second downlink carrier of the SCell 1.

S1120: The network device sends a message #β to the terminal device on a third downlink carrier of the SCell 2 (that is, an example of a third cell); and correspondingly, the terminal device receives the message #β from the network device on the third downlink carrier of the SCell 2.

The message #β indicates scheduling information of a PUSCH of a first uplink carrier of the SCell 1 (that is, an example of a second cell). That is, the terminal device can obtain, by receiving the message #β sent by the network device, scheduling information of a PUSCH #1 on which the network device schedules the first uplink carrier of the SCell 1.

S1130: The terminal device sends the PUSCH #1 to the network device on the first uplink carrier of the SCell 1 based on the received message #β; and correspondingly, the network device receives the PUSCH #1 from the terminal device on the first uplink carrier of the SCell 1.

In a possible implementation, the network device may further send DCI #γ to the terminal device on the third downlink carrier of the SCell 2, where the DCI #γ is used as scheduling information of a PUSCH #2 of a third uplink carrier of the SCell 2, scheduling information of a PDSCH #3 of the third downlink carrier of the SCell 2, and/or the like.

It should be understood that the network device may alternatively send downlink scheduling information on the SCell 2, to indicate the terminal device to schedule a PDSCH of the second downlink carrier of the SCell 1 in a downlink cross-carrier manner. However, considering that in this case, the SCell 1 not only supports downlink joint scheduling of a PDSCH with the PCell, but also supports downlink cross-carrier scheduling of a PDSCH by the SCell 2, the PDSCH of the SCell 1 may be scheduled by both the PCell and the SCell 2 in a downlink. Therefore, it may be predefined that if the SCell 1 is configured with downlink joint scheduling with the PCell, and is simultaneously scheduled by the SCell 2 in a cross-carrier manner, the SCell 2 is allowed to schedule the PUSCH of the SCell 1 in an uplink cross-carrier manner, and downlink data of the SCell 1 may be scheduled across carriers by the PCell and/or jointly scheduled in the downlink. This prevents a plurality of cells (for example, the PCell and the SCell 2) from simultaneously scheduling a PDSCH of one cell (for example, the SCell 1). In other words, uplink data/downlink data of one cell (for example, the SCell 1) can be prevented from being simultaneously scheduled by two cells (for example, the PCell and the SCell 2). This effectively reduces problems such as garbled characters, resource conflicts, and channel congestion. In addition, the terminal device may report the capability to the network device. In this case, when determining configuration information for an activated cell in which the terminal device is located, the network device may choose whether to configure and enable this function at the same time. This possible implementation can implement flexible application of resource scheduling to some extent.

In conclusion, in this possible implementation, the PUSCH of the first uplink carrier of the SCell 1 may be implemented by using uplink cross-carrier scheduling of the SCell 2. That is, the network device sends the message #β on the third downlink carrier of the SCell 2, to indicate the terminal device to schedule the PUSCH #1 of the first uplink carrier of the SCell 1 in a cross-carrier manner. The PDSCH of the second downlink carrier of the SCell 1 may be implemented by using downlink joint scheduling or downlink cross-carrier scheduling of the PCell. That is, the network device sends a message #Σ on the first downlink carrier of the PCell, to indicate the terminal device to schedule a PDSCH #4 of the second downlink carrier of the SCell 1 in a cross-carrier manner; or sends the message #α on the first downlink carrier of the PCell, to indicate the terminal device to jointly schedule the PDSCH #1 of the second downlink carrier of the SCell 1. It is clear that, a cell for cross-carrier scheduling of uplink data of the SCell 1 is the SCell 2, and a cell for downlink joint scheduling or cross-carrier scheduling of downlink data of the SCell 1 is the PCell, and the two cells are different.

According to the solution provided in the foregoing embodiment, in a carrier aggregation scenario, the network device sends the message #α on the first downlink carrier of the PCell, and the terminal device is supported to jointly schedule the PDSCH of the PCell and the SCell 1. In addition, the message #β is sent on the third downlink carrier of the SCell 2, so that an uplink scheduling requirement of the first uplink carrier of the SCell 1 is effectively implemented, to reduce overhead costs of control signaling, and implement diversified scheduling requirements and effectiveness of a communication system.

By way of example, and not limitation, in the foregoing embodiment, when the PCell and the SCell 1 support joint scheduling, how to schedule uplink data of the SCell 1 is implemented. This technical solution is a further optimization policy in a joint scheduling scenario, and meets diversified scheduling requirements. Optionally, in this embodiment of this application, the technical solution of downlink joint scheduling and the technical solution of uplink scheduling of the SCell 1 may be decoupled, and the two solutions run independently. That is, the network device and the terminal device may receive and send downlink data based on that the PCell and the SCell 1 support downlink joint scheduling, which specifically corresponds to the foregoing step S1110. For brevity, details are not described herein again.

Figure 12:
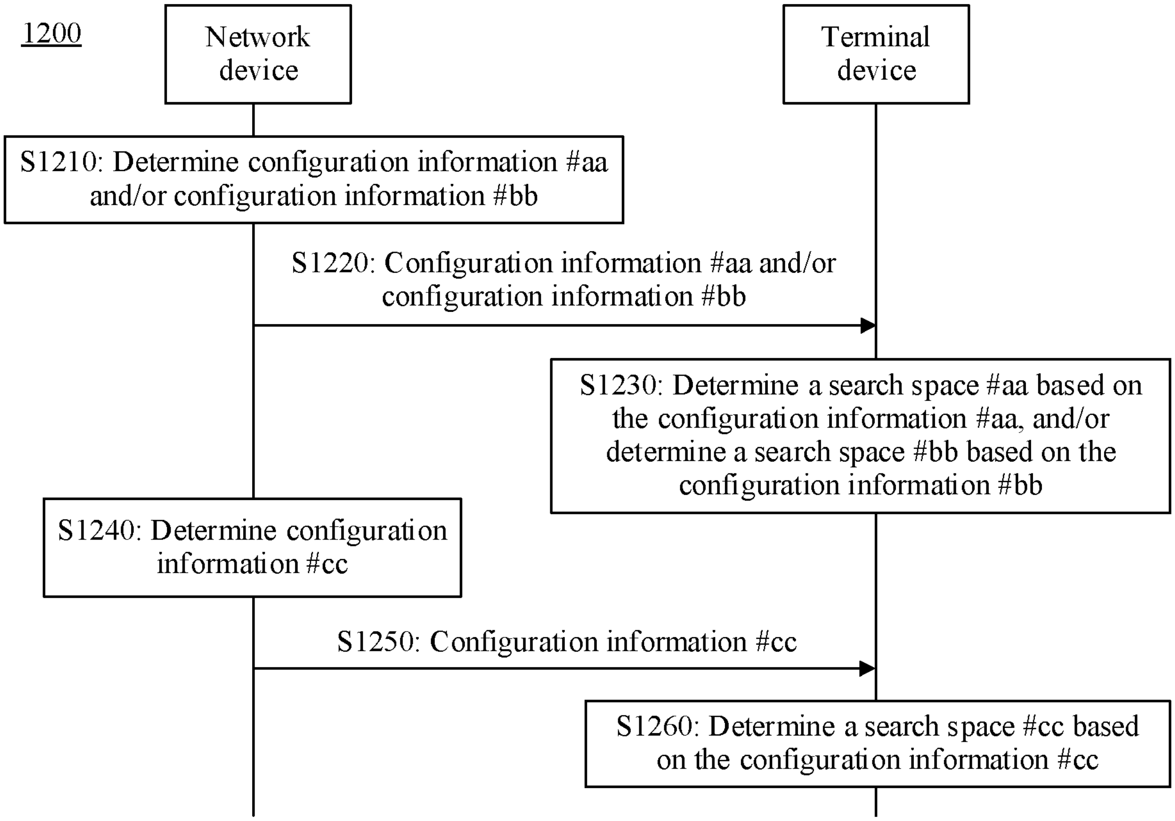
FIG. 12 is a schematic diagram of yet another example of determining a search space applicable to this application.

It should be noted that, in the foregoing possible implementation, the terminal device may monitor, on the PCell, at least one of PDCCHs corresponding to self-scheduling of the PCell, cross-carrier scheduling of the PCell, and downlink joint scheduling, and may monitor, on the SCell 2, at least one of PDCCHs corresponding to self-scheduling of the SCell 2 and cross-carrier scheduling of the SCell 2. FIG. 12 is a schematic diagram of an example in which a terminal device determines a search space of a PCell and an SCell 2. As shown in FIG. 12, the method 1200 includes the following steps.

S1210: A network device determines configuration information #aa and/or configuration information #bb.

The configuration information #aa indicates a search space #aa, represents a search space for self-scheduling a PDSCH and/or a PUSCH by a PCell, and is used to carry a message #& of self-scheduling of the PCell. The configuration information #bb indicates a search space #bb, represents a search space for jointly scheduling the PDSCH by the PCell and an SCell 1, and is used to carry a message #α.

It should be noted that, if the configuration information #aa and the configuration information #bb are the same, the search space for self-scheduling of the PCell and a search space for joint scheduling may be shared; or if the configuration information #aa and the configuration information #bb are different, the search space for self-scheduling of the PCell and a search space for downlink joint scheduling coexist and are mutually independent. A related signaling configuration is similar to that in step S610. For brevity, details are not described herein again.

S1220: The network device sends the configuration information #aa and/or configuration information #bb to the terminal device, and correspondingly, the terminal device receives the configuration information #aa and/or the configuration information #bb from the network device.

S1230: The terminal device determines the search space #aa and/or the search space #bb based on the received configuration information #aa and/or configuration information #bb.

It should be noted that, if the configuration information #aa and the configuration information #bb are the same, the search space for self-scheduling of the PCell and the search space for joint scheduling may be shared; or if the configuration information #aa and the configuration information #bb are different, the search space for self-scheduling of the PCell and the search space for joint scheduling are mutually independent. The determining of the search space is similar to the foregoing step S630. For brevity, details are not described herein again.

S1240: The network device determines configuration information #cc.

The configuration information #cc indicates a search space #cc, represents a search space used by an SCell 2 to schedule a PUSCH of a first uplink carrier of the SCell 1 in a cross-carrier manner, and is used to carry a message #bb.

In a possible implementation, if the configuration information #bb and the configuration information #cc are different, the search space for downlink joint scheduling and the search space for uplink scheduling of the SCell 1 coexist and are mutually independent. The configuration information #bb and the configuration information #cc are two sets of independent search space configurations. A related signaling configuration is similar to that in step S1040. For brevity, details are not described herein again.

S1250: The network device sends the configuration information #cc to the terminal device, and correspondingly, the terminal device receives the configuration information #cc from the network device.

The configuration information #cc includes at least configuration parameters of the associated SCell 1: nrofCandidates and searchSpaceId.

S1260: The terminal device determines the search space #cc based on the received configuration information #CC.

In a possible implementation, if the configuration information #bb and the configuration information #cc are different, the search space for downlink joint scheduling and the search space for uplink scheduling of the SCell 1 coexist and are mutually independent. The determining of the search space is similar to the foregoing step S1060. For brevity, details are not described herein again.

By way of example, and not limitation, in the foregoing embodiment, the search space for uplink scheduling of the SCell 1 is further determined based on the determined search space for downlink joint scheduling. Optionally, in this embodiment of this application, the technical solution of determining the search space for joint scheduling and the technical solution of determining the search space for uplink scheduling may be decoupled, and the two solutions run independently. That is, based on that the PCell and the SCell 1 support downlink joint scheduling, the network device may determine configuration information of the search space for joint scheduling, and send the configuration information to the terminal device. Alternatively, the terminal device may determine the corresponding search space based on the configuration information. This specifically corresponds to the foregoing steps S1210 to S1230. For brevity, details are not described herein again. According to the foregoing technical solutions, a joint scheduling method is designed, so that when joint PDSCH scheduling is configured for a carrier in a carrier aggregation scenario, a search space for joint scheduling of the carrier is configured and determined, and an uplink scheduling requirement of the carrier is implemented. This effectively reduces overhead costs of control signaling, and implements diversified scheduling requirements and effectiveness of a communication system.

The foregoing possible embodiments describe, in three possible implementations, on the basis that the PCell schedules the SCell 1, how to schedule the PUSCH of the first uplink carrier of the SCell 1 in an uplink. Similarly, the technical solution of this application is also applicable to an example in which an SCell 1 (an example of a first cell) schedules a PCell (an example of a second cell). That is, when the PCell and the SCell 1 support downlink joint scheduling, a network device may send a first message on a first downlink carrier of the SCell 1. The first message indicates scheduling information of a physical downlink shared channel PDSCH. In addition, the network device sends a second message on a second downlink carrier of the PCell, or sends a second message on the first downlink carrier of the SCell 1, or sends a second message on a third downlink carrier of an SCell 2, to schedule a PUSCH of a first uplink carrier of the PCell in an uplink. A possible implementation step is similar to the solution in which the PCell schedules the SCell 1 in the foregoing embodiment. For brevity, details are not described herein again.

It should be understood that, the network device sends the second message on the second downlink carrier of the PCell, or sends the second message on the first downlink carrier of the SCell 1, or sends the second message on the third downlink carrier of the SCell 2, to implement uplink scheduling of the PUSCH of the first uplink carrier of the PCell. DCI sizes need to be aligned and a DCI budget needs to be considered.

Particularly, as a primary cell, regardless of whether cross-carrier scheduling is configured for the PCell, a common search space of the PCell is used to transmit cell-level common information, for example, control information related to Paging, RAR, and BCCH. The information is the same for all terminal devices, and needs to be monitored.

It should be noted that, in the foregoing embodiment, when downlink joint scheduling is configured for the PCell and the SCell 1, how the network device effectively performs uplink scheduling on the SCell 1 and the PCell is separately described by using an example in which the PCell schedules the SCell 1 and the SCell 1 schedules the PCell. At the same time, a solution of configuring and determining a search space for joint scheduling is provided. However, the technical solutions in this application include but are not limited thereto. The technical solutions in this application are also applicable to a case in which joint downlink scheduling is configured for the SCell 1 and the SCell 2, and also applicable to a case in which downlink joint scheduling is configured for the PCell, the SCell 1, and the SCell 2. That is, the technical solutions in this application are also applicable to a scenario in which a Cell 1 and a Cell 2 are jointly scheduled, and DCI used for joint scheduling is sent on a Cell 3. Possible implementations of scheduling uplink data of the cell and configuration and determining of a search space for joint scheduling are basically similar to those of the foregoing technical solutions in this application. For brevity, details are not described herein again.

For example, when the SCell 1 and the SCell 2 are configured with downlink joint scheduling, and that the SCell 1 schedules the SCell 2 is used as an example, the network device sends scheduling information on the SCell 1. The scheduling information is used for downlink joint scheduling of physical downlink shared channels PDSCHs on the SCell 1 and the SCell 2. In this case, the network device may implement uplink scheduling of a physical uplink shared channel PUSCH of the SCell 2 through self-scheduling of the SCell 2, uplink cross-carrier scheduling on the SCell 1, or uplink cross-carrier scheduling on another SCell 3. A possible implementation is similar to the foregoing solution. Details are not described herein again.

For example, when joint scheduling is configured for the PCell, the SCell 1, and the SCell 2, and that the PCell schedules both the SCell 1 and the SCell 2 is used as an example, the network device sends scheduling information on the PCell. The scheduling information is used for downlink joint scheduling of a physical downlink shared channel PDSCH of the PCell, the SCell 1, and the SCell 2. In this case, the network device may implement uplink scheduling of a physical uplink shared channel PUSCH of the SCell 1 or the SCell 2 through self-scheduling of the SCell 1 or the SCell 2, uplink cross-carrier scheduling of the PCell, or uplink cross-carrier scheduling of another SCell 3. A possible implementation is similar to the foregoing technical solution. Details are not described herein again.

It should be noted that, in the foregoing embodiment, an example in which the PCell, the SCell 1, and the SCell 2 are activated cells is used only to describe the technical solution of this application more clearly. To implement the technical solution of this application, a quantity of activated cells is greater than or equal to 2. The quantity of the activated cells shall not constitute any limitation on this application.

It should be further noted that, in the foregoing possible implementations of this application, downlink joint scheduling is supported between cells, and the network device implements scheduling of uplink data based on downlink joint scheduling between cells. This effectively implements diversified scheduling requirements. It should be understood that this embodiment of this application is also applicable to uplink joint scheduling, and the network device implements scheduling of downlink data based on uplink joint scheduling between cells. For example, the cell 1 and the cell 2 support uplink joint scheduling, and DCI used for joint scheduling may be sent on the cell 1. The network device may perform uplink scheduling on a PUSCH of the cell 2 based on this scenario. A specific implementation is similar to that in the foregoing embodiment. For brevity, details are not described herein again. In addition, a manner of determining a search space for uplink joint scheduling may be similar to a manner of determining a search space for downlink joint scheduling, and details are not described herein again.

The following describes a resource determining method that is related to a cell activation manner and that is applicable to this embodiment of this application. To better understand the technical solution, a cell activation procedure is briefly described first.

A base station may configure a plurality of secondary cells for UE by using signaling 1. An initially configured cell is in a deactivated state. The base station and the UE cannot perform data transmission on the deactivated cell. The base station needs to indicate, by using signaling 2, the UE to activate a configured cell. After the cell is activated, the base station and the UE may perform data transmission on the cell. In the foregoing embodiments, cells (for example, the PCell, the SCell 1, and the SCell 2) configured for joint scheduling are all activated cells. It should be noted that the signaling 1 may also indicate activation of a cell, that is, the base station activates the cell when configuring cell information.

The cell activation procedure may include: The base station sends the signaling 2 to the UE. Correspondingly, the UE receives the signaling 2 from the base station. After the signaling 2 is processed, the UE may feed back HARQ information to the base station, that is, feed back whether the UE correctly receives the signaling 2 sent by the base station. The base station sends a signal 1 to the UE. The signal 1 is used to implement synchronization between the base station and the UE. Correspondingly, the UE receives the signal 1 from the base station. After processing the signal 1, the UE obtains, based on the measurement signal 1, information required for cell activation, including time-frequency synchronization information and reference signal power. The base station sends a signal 2 to the UE. Correspondingly, after the UE receives the signal 2 from the base station, the UE feeds back a valid channel measurement report to the base station. After receiving the valid channel measurement report sent by the UE, the base station considers that the corresponding cell is in the activated state.

For example, the signaling 1 may be radio resource control (RRC) signaling, the signaling 2 may be media access control control element (MAC CE) signaling, the signal 1 may be a synchronization signal block single side band (SSB) signal, and the signal 2 may be a channel state information-reference signal (CSI-RS). In the cell activation procedure, the UE may obtain, by using the SSB, information required in a cell activation period. However, because a periodicity of sending, receiving, and processing the SSB is long, time for activating the secondary cell is long. Therefore, to reduce the time for activating the secondary cell, a temporary reference signal may be introduced in a secondary cell activation process.

For example, the temporary reference signal may include a CSI-RS or a tracking reference signal (TRS). The UE may use a TRS as a temporary reference signal to activate a cell. In this case, the TRS may be a periodic TRS or may be an aperiodic TRS. For example, the temporary reference signal may be limited as a periodic TRS, or the temporary reference signal may be limited as an aperiodic TRS, or the temporary reference signal includes a periodic TRS and an aperiodic TRS. By indicating an aperiodic TRS, the base station may enable the UE to quickly receive the TRS, so as to more quickly obtain information required for cell activation to complete cell activation. If the temporary reference signal is a periodic TRS, configuring a TRS with a short periodicity may also enable the UE to quickly receive the TRS and complete cell activation. Similar to the TRS, the CSI-RS signaling also includes a periodic CSI-RS and an aperiodic CSI-RS. The temporary reference signal may be limited as a periodic CSI-RS, or the temporary reference signal may be limited as an aperiodic CSI-RS, or the temporary reference signal includes a periodic CSI-RS and an aperiodic CSI-RS. A technical effect of replacing the SSB with the CSI-RS is the same as that of the TRS. Compared with using an SSB with a long periodicity to complete cell activation, using a temporary reference signal can reduce a cell activation delay.

Manner 1:

The base station may configure a temporary reference signal set for the UE by using signaling 3. The temporary reference signal set may be configured based on a cell granularity, or may be configured based on a BWP granularity on a cell. The base station may send signaling 4 and signaling 5 used for cell activation to the UE. The signaling 4 indicates at least one temporary reference signal in a configured reference set, and the signaling 4 and the signaling 5 herein may be understood as a same signaling. In this manner, time for receiving and processing signaling by the UE can be reduced. This further reduces time for activating a cell. Optionally, the temporary reference signal set may be preset or predefined, that is, the base station and the UE may negotiate and specify the temporary reference signal set in advance.

For example, the signaling 3 is RRC signaling, the signaling 4 and the signaling 5 are both MAC CE signaling, and are the same MAC CE signaling. The base station activates the secondary cell by using the MAC CE signaling, and implicitly indicates a temporary reference signal on a to-be-activated cell.

It should be understood that the MAC CE signaling includes an index corresponding to a cell that needs to be activated. First, an implicit indication rule is predefined as follows: After the UE receives the MAC CE cell activation signaling, the signaling implicitly indicates a temporary reference signal used for cell activation on the cell. For example, the reference signal may be predefined according to a rule: The reference signal may be all temporary reference signals in the temporary reference signal set configured in the signaling 3, or may be one or more temporary reference signals in a reference signal set determined by the UE according to a temporary reference signal predefined rule, or may be one or more temporary reference signals in a reference signal set independently selected by the UE in a configured reference signal set. The foregoing temporary reference signal predefined rule may include: an indicated reference signal is a temporary reference signal corresponding to a maximum resource index, a minimum resource index, or an index determined by using another method in a temporary reference signal set configured on the to-be-activated cell, or an indicated reference signal is a temporary reference signal corresponding to a maximum resource index, a minimum resource index, or an index determined by using another method in a temporary reference signal set in a specific BWP of the to-be-activated cell, where a quantity of the specific BWP is greater than or equal to 1. The specific BWP may be an initially activated uplink or downlink BWP in a cell (the initially activated BWP is an initially activated BWP after a cell is activated), and may be N uplink/downlink BWPs with a lowest index or a highest index, where N is greater than or equal to 1.

Optionally, the temporary reference signal may be a TRS, the TRS includes a periodic TRS and an aperiodic TRS, and the MAC CE signaling implicitly indicates an aperiodic TRS indexed according to a predefined rule in an aperiodic TRS set. In addition, the UE may also receive a periodic TRS based on a periodic TRS configuration. That is, after receiving the MAC CE signaling used for cell activation, the UE may start to receive a corresponding reference signal based on configurations of the aperiodic TRS and the periodic TRS. Alternatively, the temporary reference signal is an aperiodic TRS, and the MAC CE signaling implicitly indicates an aperiodic TRS indexed according to a predefined rule in an aperiodic TRS set. That is, after receiving the MAC CE signaling used for cell activation, the UE may start to receive a corresponding reference signal based on an aperiodic TRS configuration. Correspondingly, the UE receives the MAC CE signaling from the base station, and determines, according to a predefined rule, a temporary reference signal that needs to be received. Alternatively, the MAC CE may implicitly indicate a TRS indexed according to a predefined rule in a TRS set, and the TRS set includes a periodic TRS and an aperiodic TRS. That is, after the UE receives the MAC CE signaling used for cell activation, if the implicitly indicated TRS is a periodic TRS, the UE receives the corresponding reference signal based on the periodic TRS configuration; or if the implicitly indicated TRS is an aperiodic TRS, the UE receives the aperiodic TRS based on the aperiodic TRS configuration, or receive a corresponding TRS based on the aperiodic TRS and the periodic TRS.

For example, to enable the base station to select, when sending the MAC CE signaling to activate the cell, whether to simultaneously trigger the temporary reference signal, the base station may add an identifier indicating whether to trigger the temporary reference signal to the existing MAC CE signaling, where the identifier may correspond to all cells; or add identifiers indicating whether to trigger a plurality of temporary reference signals to the MAC CE signaling, and in this case, each cell may correspond to one identifier. For example, the MAC CE signaling indicates to active a cell 1, a cell 3, and a cell 5, and carries an identifier indicating whether the cell 1, the cell 3, and the cell 5 simultaneously trigger the foregoing predefined temporary reference signal. Alternatively, the cell 1 corresponds to an identifier for triggering the temporary reference signal, the cell 3 corresponds to an identifier for not triggering the temporary reference signal, and the cell 5 corresponds to an identifier for triggering the temporary reference signal.

For another example, when configuring the cell information by using the RRC signaling, the base station may add, to the RRC signaling, an identifier indicating whether to simultaneously trigger or determine the temporary reference signal. After receiving a command for activating the cell, the UE determines, based on whether cell configuration information includes an identifier for simultaneously triggering or determining the temporary reference signal, whether to receive the foregoing predefined temporary reference signal. For example, the base station adds a configuration cell #a by using the RRC signaling, and if an identifier that indicates whether to simultaneously trigger the temporary reference signal and that corresponds to the cell #a is true or enabled, after receiving the MAC CE activation signaling, the UE determines, according to the predefined rule, a TRS used for cell activation. If the identifier that indicates whether to simultaneously trigger the temporary reference signal and that corresponds to the cell #a is false or disabled, after receiving the MAC CE activation signaling, the UE does not determine, according to the predefined rule, the TRS used for cell activation. For example, bits "1" and "0" may indicate whether the identifier for triggering the temporary reference signal is true or false. The predefined rule is as follows. When an identifier for triggering or determining the temporary reference signal in the RRC signaling received by the UE is 1, it indicates that the UE determines to receive the predefined temporary reference signal. On the contrary, the UE determines not to receive the predefined temporary reference signal.

Optionally, the base station and the UE may also predefine a rule: When the RRC signaling sent by the base station includes an identifier for triggering or determining the temporary reference signal, correspondingly, the UE determines, based on the identifier for triggering or determining the temporary reference signal, to receive the predefined temporary reference signal. When the RRC signaling sent by the base station does not include the identifier for triggering or determining the temporary reference signal, correspondingly, the UE does not receive the identifier for triggering or determining the temporary reference signal, and further determines not to receive the predefined temporary reference signal.

Alternatively, the base station may implement a predefined rule through configuration. If no available temporary reference signal set is configured on a first activated downlink BWP of a to-be-activated cell, after receiving cell activation signaling, the UE determines not to simultaneously trigger the temporary reference signal. If there is an available temporary reference signal set configured on the BWP, after receiving the cell activation signal, the UE determines to simultaneously trigger the temporary reference signal.

For example, the UE may report whether a capability of simultaneously triggering cell activation and the temporary reference signal is supported. The capability may indicate that capabilities of all configured cells are the same, or capabilities of cells are different. For example, the capability is supported on the cell 1 and is not supported on a cell 2. The base station and the UE may determine, based on the capability of the UE, whether the cell activation signaling implicitly triggers the temporary reference signal simultaneously. Further, after the UE reports the capability, the base station may configure, based on the capability of the UE, whether the UE supports simultaneous triggering of carrier activation and the temporary reference signal on each cell. For UE that supports the simultaneous triggering capability, the base station may configure an identifier of supported or unsupported in a cell configuration. For UE that does not support the simultaneous triggering capability, the base station may configure an identifier of unsupported in the cell configuration.

Optionally, the signaling 4 and the signaling 5 may alternatively be radio resource control RRC or downlink control information DCI. In Manner 1, cell activation and the temporary reference signal are simultaneously indicated, so that signaling overheads can be reduced while a cell activation delay is reduced.

In Manner 1, cell activation and the temporary reference signal can be simultaneously indicated. This can enhance flexibility of indicating the temporary reference signal while reducing the cell activation delay.

Manner 2

For example, the signaling 3 is RRC signaling, the signaling 4 is DCI, and the signaling 5 is a MAC CE. The MAC CE is carried in a PDSCH, and the PDSCH is scheduled by the DCI. That is, the base station schedules a PDSCH by using one piece of DCI and triggers a temporary reference signal used for cell activation on a to-be-activated cell. The PDSCH includes one piece of MAC CE signaling, the MAC CE signaling indicates one or more to-be-activated cells, the DCI indicates a field of a temporary signal, the field of the temporary signal indicates the temporary reference signal used for cell activation on the one or more cells, and the field may be a CSI request field in the DCI.

It should be noted that, in this possible implementation, the base station needs to send the signaling 4 to the UE, to indicate at least one temporary reference signal in a temporary reference signal set used to activate the cell. The base station further needs to send the signaling 5 to the UE. The signaling 5 is used for cell activation. Optionally, the base station may simultaneously send the signaling 4 and the signaling 5 used for cell activation to the UE. Correspondingly, the UE may simultaneously receive the signaling 4 and the signaling 5. A difference between Manner 1 and Manner 2 lies in that, in Manner 1, when sending the signaling 5 used for cell activation, the base station may implicitly indicate the temporary reference signal used for cell activation on the cell, that is, the base station may not send the signaling 4 to the UE. However, in Manner 2, the base station needs to send the signaling 4 and the signaling 5 to the UE. Interaction between the base station and the UE based on the signaling 3 is similar to that in Manner 1. For brevity, details are not described herein again.

For example, the temporary reference signal may be a TRS, the TRS includes a periodic TRS and an aperiodic TRS, and the MAC CE signaling implicitly indicates an aperiodic TRS indexed according to a predefined rule in an aperiodic TRS set. In addition, the UE may also receive a periodic TRS based on a periodic TRS configuration. That is, after receiving the MAC CE signaling used for cell activation, the UE may start to receive a corresponding reference signal based on configurations of the aperiodic TRS and the periodic TRS. Alternatively, the temporary reference signal is an aperiodic TRS, and the MAC CE signaling implicitly indicates an aperiodic TRS indexed according to a predefined rule in an aperiodic TRS set. That is, after receiving the MAC CE signaling used for cell activation, the UE may start to receive a corresponding reference signal based on an aperiodic TRS configuration. Correspondingly, the UE receives the MAC CE signaling from the base station, and determines, according to a predefined rule, a temporary reference signal that needs to be received.

Optionally, the base station may configure a plurality of temporary reference signal sets for the UE by using the signaling 3. The temporary reference signal set may be configured based on a cell granularity, or may be configured based on a BWP granularity on a cell. In this case, the signaling 4 sent by the base station to the UE may indicate one or more temporary reference signal sets in a configured reference signal sets, or may indicate one or more temporary reference signals in at least one temporary reference signal set in the configured reference signal sets. A specific implementation has been described above. For brevity, details are not described herein again.

According to the foregoing embodiment, the base station can implement cell activation by sending activation request information to the UE with reference to the predefined rule, and further implement diversified resource scheduling requirements.

Manner 3: The base station may configure a temporary reference signal set for the UE by using the signaling 3. The temporary reference signal set may be configured based on a cell granularity, or may be configured based on a BWP granularity on a cell. The base station may send the signaling 4 and the signaling 5 used for cell activation to the UE. The signaling 4 indicates at least one temporary reference signal in a temporary reference signal set configured on a to-be-activated secondary cell, and the signaling 5 indicates activation of at least one secondary cell. The signaling 4 and the signaling 5 may be same signaling, and the signaling may simultaneously trigger activation of at least one secondary cell and a corresponding temporary reference signal on the to-be-activated secondary cell.

The temporary reference signal set includes at least one temporary reference signal. A temporary reference signal configuration may include at least one of a temporary reference signal index, a quantity of temporary reference signal bursts in time domain, a gap between different temporary reference signal bursts in time domain, a frequency domain resource of the temporary reference signal, an offset of the temporary reference signal, and an index of a bandwidth part. The temporary reference signal index identifies a configured temporary reference signal. The quantity of temporary reference signal bursts in time domain identifies a quantity of temporary reference signal bursts, and one temporary reference signal burst may be four CSI-RS resources included in two slots in time domain, or two CSI-RS resources included in one slot. For example, if two temporary reference signal bursts are configured, the base station sends the temporary reference signal bursts twice in time domain. A gap between different temporary reference signal bursts in time domain indicates a gap between adjacent temporary reference signal bursts when a quantity of temporary reference signal bursts in time domain is greater than or equal to 2. The gap may be X slots or Y milliseconds. A parameter set corresponding to a slot is the same as that of the temporary reference signal, and the parameter set includes a subcarrier spacing and a cyclic prefix type. For different subcarrier spacings, a value range of X may be different. For example, for 15 kHz, X ranges from 2 to 10; and for 30 kHz, X ranges from 4 to 20. The frequency domain resource of the temporary reference signal identifies a physical resource block index of the temporary reference signal in frequency domain. The offset of the temporary reference signal identifies a time domain offset $Z=(Z2-Z1)$. The terminal device receives trigger signaling of the temporary reference signal at time Z1, or sends an acknowledgment/negative acknowledgment (ACK/NACK) feedback of the temporary reference signal at the time Z1. The base station sends the triggered temporary reference signal at time Z2. Z is used as an example. A unit of a time domain offset is a slot or millisecond. If a unit of Z is a slot, a minimum value of the time domain offset Z is related to a subcarrier spacing u1 of the trigger signaling, or is related to a subcarrier spacing u2 of the temporary reference signal, or is related to a subcarrier spacing u3 corresponding to a PUCCH that carries trigger signaling feedback information, or is related to u1 and u2, or is related to u1 and u3, or is related to u2 and u3, or is related to u1, u2, and u3. For example, a subcarrier spacing corresponding to the slot is the same as u1, u2, or u3, or is the same as a maximum value of u1, u2, and u3, or is the same as a minimum value of u1, u2, and u3. The index of the bandwidth part is a bandwidth part in which frequency domain of the temporary reference signal is located.

For example, the signaling 3 is RRC signaling, the signaling 4 and the signaling 5 are same MAC CE signaling, and the base station simultaneously activates a secondary cell and triggers a temporary reference signal on the secondary cell by using one piece of MAC CE signaling. The MAC CE signaling includes at least one of the following fields:

Ci: indicating an activated/deactivated state of a secondary cell i, where if a value of Ci is 1, the secondary cell i is to be activated, or if a value of Ci is 0, the secondary cell i is to be deactivated, i is an integer greater than or equal to 1 and less than or equal to 31, and the MAC CE signaling is predefined to include 31 C fields, corresponding to C1 to C31; and a reserved bit R: set to 0.

For each secondary cell i whose Ci value is 1 and that is in the deactivated state, at least one of the following fields is included:

a bandwidth part index j: a downlink or uplink bandwidth part index j on the secondary cell i;

a temporary reference signal index k: a temporary reference signal index k configured in the bandwidth part index j on the secondary cell i, where in this case, a temporary reference signal in each BWP is independently numbered; or a temporary reference signal index k on the secondary cell i, where in this case, a temporary reference signal in the secondary cell is independently numbered, and temporary reference signals in different BWPs are jointly numbered;

a quantity m of temporary reference signal bursts in time domain: indicating a quantity of times that a temporary reference signal corresponding to the temporary reference signal index k is sent in time domain, and m is an integer greater than or equal to 0;

a time domain interval between two adjacent temporary reference signal bursts: if a quantity of temporary reference signal bursts in time domain is greater than or equal to 2, the time domain interval between two adjacent temporary reference signal bursts indicates a time domain interval between two adjacent bursts; and a transmission configuration indication status index: indicating a transmission configuration indication status of the temporary reference signal corresponding to the temporary reference signal index k, which is specifically a quasi co-location source of the temporary reference signal.

Optionally, for a secondary cell whose Ci value is 0, a same bit 0 is used in the MAC CE signaling to fill a field related to the temporary reference signal.

Optionally, for a secondary cell whose Ci value is 1, if a current state of the secondary cell is an activated state, a same bit 0 is used in the MAC CE signaling to fill a field related to the temporary reference signal.

Optionally, after receiving the MAC CE signaling, the UE ignores a temporary reference signal configuration corresponding to the secondary cell whose Ci value is 0, and ignores a temporary reference signal configuration corresponding to an activated secondary cell whose Ci value is 1.

Optionally, a bandwidth part in the MAC CE signaling may be predefined as a first activated bandwidth part, and does not need to be indicated in the MAC CE signaling.

Optionally, when a quantity of sent temporary reference signal bursts in time domain is greater than or equal to 2, an interval between two adjacent temporary reference signal bursts in time domain may be predefined as, for example, 2 milliseconds.

Optionally, the quantity of sent temporary reference signal bursts in time domain is predefined as N, where N is an integer greater than or equal to 1, for example, N is 2.

Manner 4: The base station may configure a temporary reference signal set for the UE by using the signaling 3. The temporary reference signal set may be configured based on a cell granularity, or may be configured based on a BWP granularity on a cell. The base station may send the signaling 4 and the signaling 5 used for cell activation to the UE. The signaling 4 indicates at least one temporary reference signal in a temporary reference signal set configured on a to-be-activated cell, and the signaling 5 indicates activation of at least one secondary cell. The signaling 4 and the signaling 5 may be two pieces of signaling carried on a same PDSCH or transport block.

The temporary reference signal set includes at least one temporary reference signal. A temporary reference signal configuration may include at least one of a temporary reference signal index, a quantity of temporary reference signal bursts in time domain, a gap between different temporary reference signal bursts in time domain, a frequency domain resource of the temporary reference signal, an offset of the temporary reference signal, and an index of a bandwidth part. The temporary reference signal index identifies a configured temporary reference signal. The quantity of temporary reference signal bursts in time domain identifies a quantity of temporary reference signal bursts, and one temporary reference signal burst may be four CSI-RS resources included in two slots in time domain, or two CSI-RS resources included in one slot. For example, if two temporary reference signal bursts are configured, the base station sends the temporary reference signal bursts twice in time domain. A gap between different temporary reference signal bursts in time domain indicates a gap between adjacent temporary reference signal bursts when a quantity of temporary reference signal bursts in time domain is greater than or equal to 2. The gap may be X slots or Y milliseconds. A parameter set corresponding to a slot is the same as that of the temporary reference signal, and the parameter set includes a subcarrier spacing and a cyclic prefix type. For different subcarrier spacings, a value range of X may be different. For example, for 15 kHz, X ranges from 2 to 10; and for 30 kHz, X ranges from 4 to 20. The frequency domain resource of the temporary reference signal identifies a physical resource block index of the temporary reference signal in frequency domain. The offset of the temporary reference signal identifies a time domain offset Z=(Z2−Z1). The terminal device receives trigger signaling of the temporary reference signal at time Z1, or sends an acknowledgment/negative acknowledgment (ACK/NACK) feedback of the temporary reference signal at the time Z1. The base station sends the triggered temporary reference signal at time Z2. Z is used as an example. A unit of a time domain offset is a slot or millisecond. If a unit of Z is a slot, a minimum value of the time domain offset Z is related to a subcarrier spacing u1 of the trigger signaling, or is related to a subcarrier spacing u2 of the temporary reference signal, or is related to a subcarrier spacing u3 corresponding to a PUCCH that carries trigger signaling feedback information, or is related to u1 and u2, or is related to u1 and u3, or is related to u2 and u3, or is related to u1, u2, and u3. For example, a subcarrier spacing corresponding to the slot is the same as u1, u2, or u3, or is the same as a maximum value of u1, u2, and u3, or is the same as a minimum value of u1, u2, and u3. The index of the bandwidth part is a bandwidth part in which frequency domain of the temporary reference signal is located.

For example, the signaling 3 is RRC signaling, and the signaling 4 and the signaling 5 are different MAC CE signaling in a same PDSCH or transport block. The base station triggers activation of the secondary cell by using first MAC CE signaling, and triggers a temporary reference signal on the secondary cell by using second MAC CE signaling. The first MAC CE signaling includes at least one of the following fields:

Cii: indicating an activated/deactivated state of a secondary cell ii, where if a value of Cii is 1, the secondary cell ii should be activated, or if a value of Cii is 0, the secondary cell ii is to be deactivated, ii is an integer greater than or equal to 1 and less than or equal to 31, and the MAC CE signaling is predefined to include 31 C fields, corresponding to C1 to C31; and a reserved bit R: set to 0.

The second MAC CE signaling includes at least one of the following fields:

a serving cell index f: an index f of a to-be-activated secondary cell, where each secondary cell f includes at least one of the following fields:

a bandwidth part index jj: a downlink or uplink bandwidth part index jj on the secondary cell f;

a temporary reference signal index kk: a temporary reference signal index kk configured in the bandwidth part index jj on the secondary cell f, where in this case, a temporary reference signal in each BWP is independently numbered; or a temporary reference signal index kk on the secondary cell f, where in this case, a temporary reference signal in the secondary cell is independently numbered, and temporary reference signals in different BWPs are jointly numbered;

a quantity mm of temporary reference signal bursts in time domain: indicating a quantity of times that a temporary reference signal corresponding to the temporary reference signal index kk is sent in time domain, and mm is an integer greater than or equal to 0;

a time domain interval between two adjacent temporary reference signal bursts: if a quantity of temporary reference signal bursts in time domain is greater than or equal to 2, the time domain interval between two adjacent temporary reference signal bursts indicates a time domain interval between two adjacent bursts; and a transmission configuration indication status index: indicating a transmission configuration indication status of the temporary reference signal corresponding to the temporary reference signal index kk, which is specifically a quasi co-location source of the temporary reference signal.

Optionally, the second MAC CE signaling includes at least one of the following fields.

For a secondary cell ii whose Cii value is 1 in the first MAC CE signaling and that is in the deactivated state, at least one of the following fields is included:

a bandwidth part index jjj: a downlink or uplink bandwidth part index jjj on the secondary cell ii;

a temporary reference signal index kkk: a temporary reference signal index kkk configured in the bandwidth part index jjj on the secondary cell ii, where in this case, a temporary reference signal in each BWP is independently numbered; or a temporary reference signal index kkk on the secondary cell ii, where in this case, a temporary reference signal in the secondary cell is independently numbered, and temporary reference signals in different BWPs are jointly numbered;

a quantity mmm of temporary reference signal bursts in time domain: indicating a quantity of times that a temporary reference signal corresponding to the temporary reference signal index kkk is sent in time domain, and mmm is an integer greater than or equal to 0;

a time domain interval between two adjacent temporary reference signal bursts: if a quantity of temporary reference signal bursts in time domain is greater than or equal to 2, the time domain interval between two adjacent temporary reference signal bursts indicates a time domain interval between two adjacent bursts; and a transmission configuration indication status index: indicating a transmission configuration indication status of the temporary reference signal corresponding to the temporary reference signal index kkk, which is specifically a quasi co-location source of the temporary reference signal.

Optionally, for a secondary cell whose Cii value is 0, a same bit 0 is used in the MAC CE signaling to fill a field related to the temporary reference signal.

Optionally, for a secondary cell whose Cii value is 1, if a current state of the secondary cell is an activated state, a same bit 0 is used in the MAC CE signaling to fill a field related to the temporary reference signal.

Optionally, after receiving the MAC CE signaling, the UE ignores a temporary reference signal configuration corresponding to the secondary cell whose Cii value is 0, and ignores a temporary reference signal configuration corresponding to an activated secondary cell whose Cii value is 1.

Optionally, a bandwidth part in the second MAC CE signaling may be predefined as a first activated bandwidth part, and does not need to be indicated in the MAC CE signaling.

Optionally, when a quantity of sent temporary reference signal bursts in time domain is greater than or equal to 2, an interval between two adjacent temporary reference signal bursts in time domain may be predefined as, for example, 2 milliseconds. Optionally, the quantity of sent temporary reference signal bursts in time domain is predefined as N, where N is an integer greater than or equal to 1, for example, N is 2.

It should be understood that specific examples in embodiments of this application are merely intended to help a person skilled in the art better understand embodiments of this application, but are not intended to limit the scope of embodiments of this application.

It should be further understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application. Embodiments described in this specification may be independent solutions, or may be combined based on internal logic. All these solutions fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device. The foregoing describes in detail a resource scheduling method applicable to embodiments of this application, and the following describes an apparatus applicable to embodiments of this application.

Figure 13:
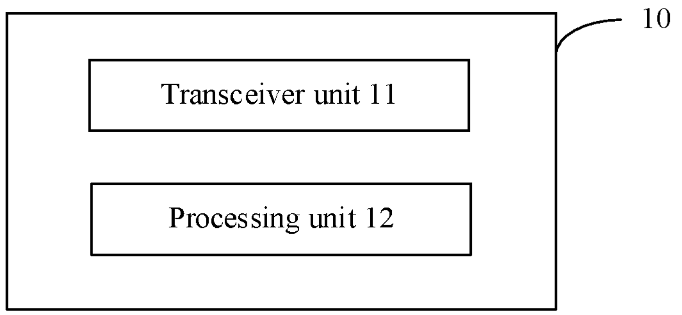
FIG. 13 is a schematic diagram of an example of a communication device applicable to this application.

According to the foregoing method, FIG. 13 is a schematic diagram of a communication device 10, for example, a network device, applicable to an embodiment of this application. As shown in FIG. 13, the communication device 10 includes a transceiver unit 11 and a processing unit 12.

For example, the transceiver unit 11 is configured to send a first message on a first downlink carrier of a first cell. The first message indicates scheduling information of a physical downlink shared channel PDSCH, and the PDSCH corresponds to the first downlink carrier of the first cell and a second downlink carrier of a second cell.

Optionally, the transceiver unit 11 is further configured to send a second message. The second message indicates scheduling information of a physical uplink shared channel PUSCH of a first uplink carrier of the second cell.

Optionally, the transceiver unit 11 is further configured to receive the PUSCH on the first uplink carrier of the second cell based on the second message.

It should be understood that the communication device 10 may correspond to the network device in the resource scheduling method 500/900/1100 according to embodiments of this application. The communication device 10 may include a module (or a unit) configured to perform the method performed by the network device in the resource scheduling method 500/900/1100 in FIG. 5/FIG. 9/FIG. 11. In addition, modules (or units) in the communication device 10 and the foregoing other operations and/or functions are respectively used to implement corresponding procedures of the resource scheduling method 500/900/1100 in FIG. 5/FIG. 9/FIG. 11.

Specifically, the transceiver unit 11 is configured to perform S510, S520, and S530/S910, S920, and S930/S1010, S1020, and S1030 in the method 500/900/1100. A process in which the modules (or units) perform the foregoing corresponding steps has been described in detail in the method 500/900/1000. For brevity, details are not described herein again.

It should be further understood that the communication device 10 may correspond to the network device in the method 600/1000/1200 for determining a search space according to embodiments of this application. The communication device 10 may include a module (or a unit) configured to perform the method performed by the network device in the method 600/1000/1200 for determining a search space in FIG. 6/FIG. 10/FIG. 12. In addition, modules (or units) in the communication device 10 and the foregoing other operations and/or functions are respectively used to implement corresponding procedures of the method 600/1000/1200 for determining a search space in FIG. 6/FIG. 10/FIG. 12.

Specifically, the transceiver unit 11 is configured to perform S620/S1020/S1220 in the method 600/1000/1200, and the processing unit 12 is configured to perform S610/S1010/S1210 in the method 600/1000/1200. A process in which the modules (or units) perform the foregoing corresponding steps has been described in detail in the method 600/1000/1200. For brevity, details are not described herein again.

It should be understood that the structure of the communication device 10 shown in FIG. 13 is merely a possible form, and should not constitute any limitation on this embodiment of this application. This application does not exclude a possibility that another form of network device may appear in the future.

It should be understood that the communication device 10 according to this embodiment of this application may correspond to the network device for scheduling a resource and determining a search space in the foregoing method embodiments. In addition, the foregoing and other management operations and/or functions of the modules in the communication device 10 are separately used to implement corresponding steps of the foregoing methods, and therefore can also achieve beneficial effects in the foregoing method embodiments.

It should be further understood that the processing module (or unit) in this embodiment of this application may be implemented by a processor, and the transceiver module (or unit) may be implemented by a transceiver.

Figure 14:
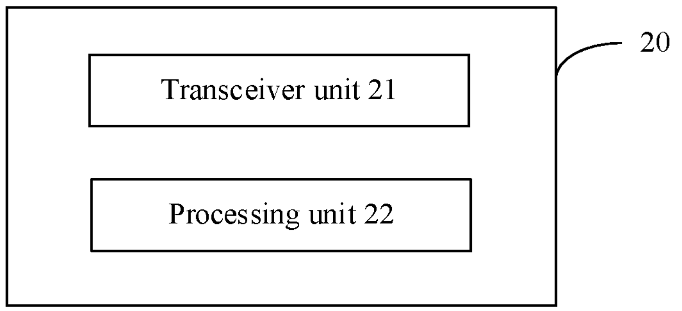
FIG. 14 is a schematic diagram of another example of a communication device applicable to this application.

According to the foregoing method, FIG. 14 is a schematic diagram of a communication device 20, for example, a terminal device, applicable to an embodiment of this application. As shown in FIG. 14, the communication device 20 includes a transceiver unit 21 and a processing unit 22.

For example, the transceiver unit 21 is configured to receive a first message on a first downlink carrier of a first cell. The first message indicates scheduling information of a physical downlink shared channel PDSCH, and the PDSCH corresponds to the first downlink carrier of the first cell and a second downlink carrier of a second cell.

Optionally, the transceiver unit 21 is further configured to receive a second message. The second message indicates scheduling information of a physical uplink shared channel PUSCH of a first uplink carrier of the second cell.

Optionally, the transceiver unit 21 is further configured to send the PUSCH on the first uplink carrier of the second cell based on the second message.

It should be understood that the communication device 20 may correspond to the terminal device in the resource scheduling method 500/900/1100 according to embodiments of this application. The communication device 20 may include a module (or a unit) configured to perform the method performed by the terminal device in the resource scheduling method 500/900/1100 in FIG. 5/FIG. 9/FIG. 11. In addition, modules (or units) in the communication device 20 and the foregoing other operations and/or functions are respectively used to implement corresponding procedures of the resource scheduling method 500/900/1100 in FIG. 5/FIG. 9/FIG. 11.

Specifically, the transceiver unit 21 is configured to perform S510, S520, and S530/S910, S920, and S930/S1110, S1120, and S1130 in the method 500/900/1100. A process in which the modules (or units) perform the foregoing corresponding steps has been described in detail in the method 500/900/1100. For brevity, details are not described herein again.

It should be understood that the communication device 20 may correspond to the terminal device in the method 600/1000/1200 for determining a search space according to embodiments of this application. The communication device 20 may include a module (or a unit) configured to perform the method performed by the terminal device in the method 600/1000/1200 for determining a search space in FIG. 6/FIG. 10/FIG. 12. In addition, modules (or units) in the communication device 20 and the foregoing other operations and/or functions are respectively used to implement corresponding procedures of the method 600/1000/1200 for determining a search space in FIG. 6/FIG. 10/FIG. 12.

Specifically, the transceiver unit 21 is configured to perform S620/S1020/S1220 in the method 600/1000/1200, and the processing unit 22 is configured to perform S630/S1030/S1230 in the method 600/1000/1200. A process in which the modules (or units) perform the foregoing corresponding steps has been described in detail in the method 600/1000/1200. For brevity, details are not described herein again.

It should be understood that the structure of the communication device 20 shown in FIG. 14 is merely a possible form, and should not constitute any limitation on this embodiment of this application. This application does not exclude a possibility that another form of terminal device may appear in the future.

It should be understood that the communication device 20 according to this embodiment of this application may correspond to the terminal device for scheduling a resource and determining a search space in the foregoing method embodiments. In addition, the foregoing and other management operations and/or functions of the modules in the communication device 20 are separately used to implement corresponding steps of the foregoing methods, and therefore can also achieve beneficial effects in the foregoing method embodiments.

It should be further understood that the processing module (or unit) in this embodiment of this application may be implemented by a processor, and the transceiver module (or unit) may be implemented by a transceiver.

Figure 15:
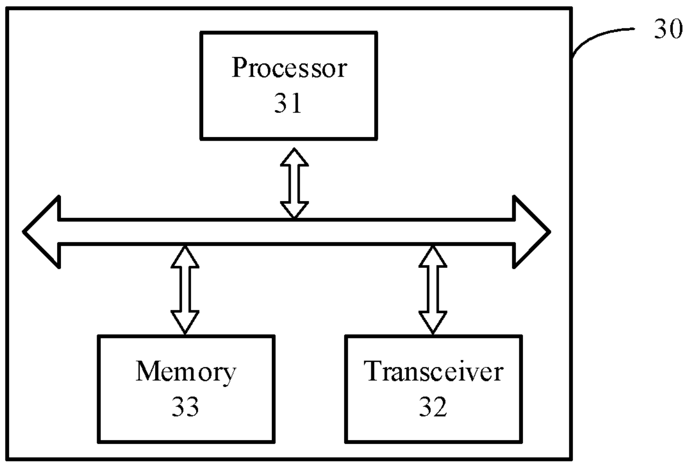
FIG. 15 is a schematic diagram of still another example of a communication device applicable to this application.

According to the foregoing method, FIG. 15 is a schematic diagram of a network device 30 applicable to an embodiment of this application. As shown in FIG. 15, the network device 30 includes a processor 31, a transceiver 32, and a memory 33.

It should be understood that the processor 31, the transceiver 32, and the memory 33 communicate with each other through an internal connection path, to transmit a control signal and/or a data signal. In a possible design, the processor 31, the transceiver 32, and the memory 33 may be implemented by using a chip. The memory 33 may store program code, and the processor 31 invokes the program code stored in the memory 33, to implement a corresponding function of the network device.

For example, the processor 31 is configured to: determine first configuration information of a first cell, where the first configuration information of the first cell indicates a first search space; and determine first configuration information of a second cell, where the first configuration information of the second cell indicates the first search space.

For example, the transceiver 32 is configured to: send a first message on a first downlink carrier of the first cell, where the first message indicates scheduling information of a physical downlink shared channel PDSCH, and the PDSCH corresponds to the first downlink carrier of the first cell and a second downlink carrier of the second cell; send a second message, where the second message indicates scheduling information of a physical uplink shared channel PUSCH of a first uplink carrier of the second cell; and receive the PUSCH on the first uplink carrier of the second cell based on the second message.

It may be understood that, although not shown, the network device 30 may further include another apparatus, for example, an input apparatus, an output apparatus, or a battery.

Optionally, in some embodiments, the memory 33 may store some or all instructions used to perform the methods performed by the network device in the foregoing methods. The processor 31 may execute the instructions stored in the memory 33 and complete, in combination with other hardware (for example, the transceiver 32), the steps performed by the network device in the foregoing methods. For a specific working process and beneficial effects, refer to descriptions in the foregoing method embodiments.

Figure 16:
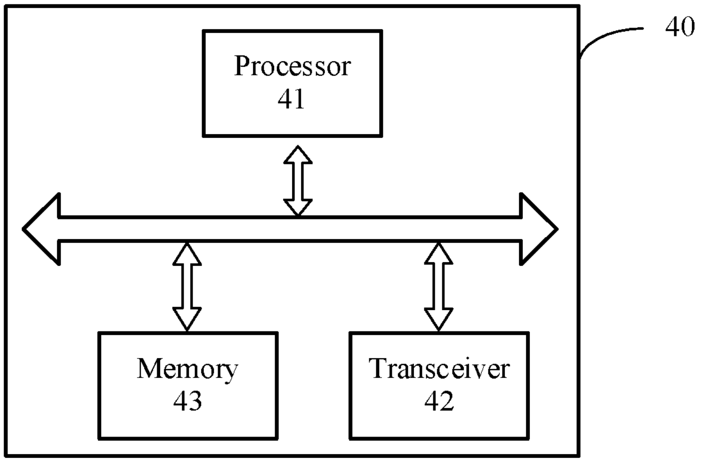
FIG. 16 is a schematic diagram of yet another example of a communication device applicable to this application.

According to the foregoing method, FIG. 16 is a schematic diagram of a terminal device 40 applicable to an embodiment of this application. As shown in FIG. 16, the terminal device 40 includes a processor 41, a transceiver 42, and a memory 43.

It should be understood that the processor 41, the transceiver 42, and the memory 43 communicate with each other through an internal connection path, to transmit a control signal and/or a data signal. In a possible design, the processor 41, the transceiver 42, and the memory 43 may be implemented by using a chip. The memory 43 may store program code, and the processor 41 invokes the program code stored in the memory 43, to implement a corresponding function of the terminal device.

For example, the processor 41 is configured to: detect a third message in a first search space, and detect a first message in a second search space.

For example, the transceiver 42 is configured to: receive the first message on a first downlink carrier of a first cell, where the first message indicates scheduling information of a physical downlink shared channel PDSCH, and the PDSCH corresponds to the first downlink carrier of the first cell and a second downlink carrier of a second cell; receive a second message, where the second message indicates scheduling information of a physical uplink shared channel PUSCH of a first uplink carrier of the second cell; and send the PUSCH on the first uplink carrier of the second cell based on the second message.

It may be understood that, although not shown, the terminal device 40 may further include another apparatus, for example, an input apparatus, an output apparatus, or a battery.

Optionally, in some embodiments, the memory 43 may store some or all instructions used to perform the methods performed by the terminal device in the foregoing methods. The processor 41 may execute the instructions stored in the memory 43 and complete, in combination with other hardware (for example, the transceiver 42), the steps performed by the terminal device in the foregoing methods. For a specific working process and beneficial effects, refer to descriptions in the foregoing method embodiments.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitation, RAMs in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions or computer programs. When the computer instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It should be further understood that the "first", "second", "third", and the like mentioned in this specification are merely used to distinguish between the technical solutions of this application more clearly, and should not constitute any limitation on this application.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or a network such as the Internet interacting with another system by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by an apparatus, radio resource control (RRC) signaling, wherein the RRC signaling configures a temporary reference signal set at a cell granularity, the temporary reference signal set comprises at least one temporary reference signal, the RRC signaling comprises a temporary reference signal configuration, and the temporary reference signal configuration indicates a temporary reference signal index, an offset of a temporary reference signal, and a gap between different temporary reference signal bursts in a time domain, wherein the offset of the temporary reference signal identifies a time domain offset between time at which the apparatus receives trigger signaling of the temporary reference signal and time at which the temporary reference signal is triggered;

receiving, by the apparatus, media access control (MAC) control element (CE) signaling, wherein the MAC CE signaling comprises an activation/deactivation status indicator field of a secondary cell and a temporary reference signal index indicator field on the secondary cell, and the activation/deactivation status indicator field of the secondary cell indicates activation of the secondary cell; and triggering, by the apparatus, the activation of the secondary cell in response to the MAC CE signaling, and receiving the temporary reference signal on the secondary cell based on the temporary reference signal configuration and the temporary reference signal index indicated by the temporary reference signal index indicator field on the secondary cell.

2. The method according to claim 1, wherein the temporary reference signal configuration further indicates a quantity of temporary reference signal bursts in the time domain, a frequency domain resource of the temporary reference signal, and an index of a bandwidth part.

3. The method according to claim 1, wherein the temporary reference signal comprises an aperiodic channel state information (CSI)-reference signal (RS) or an aperiodic tracking reference signal (TRS).

4. The method according to claim 1, wherein a value of the activation/deactivation status indicator field of the secondary cell is 1 to indicate the activation of the secondary cell.

5. The method according to claim 1, wherein information required for cell activation to complete the cell activation is obtained based on the temporary reference signal.

6. The method according to claim 1, wherein the MAC CE signaling comprising the temporary reference signal index indicator field on the secondary cell is based on the activation/deactivation status indicator field in the MAC CE signaling indicating the activation of the secondary cell.

7. A method, comprising:

sending, by an apparatus, radio resource control (RRC) signaling, wherein the RRC signaling configures a temporary reference signal set at a cell granularity, the temporary reference signal set comprises at least one temporary reference signal, the RRC signaling comprises a temporary reference signal configuration, and the temporary reference signal configuration indicates a temporary reference signal index, an offset of a temporary reference signal, and a gap between different temporary reference signal bursts in a time domain, wherein the offset of the temporary reference signal identifies a time domain offset between time at which the apparatus receives trigger signaling of the temporary reference signal and time at which the temporary reference signal is triggered; and sending, by the apparatus, media access control (MAC) control element (CE) signaling, wherein the MAC CE signaling comprises an activation/deactivation status indicator field of a secondary cell and a temporary reference signal index indicator field on the secondary cell, and the activation/deactivation status indicator field of the secondary cell indicates activation of the secondary cell.

8. The method according to claim 7, wherein the temporary reference signal configuration further indicates a quantity of temporary reference signal bursts in the time domain, a frequency domain resource of the temporary reference signal, and an index of a bandwidth part.

9. The method according to claim 7, wherein the temporary reference signal comprises an aperiodic channel state information (CSI)-reference signal (RS) or an aperiodic tracking reference signal (TRS).

10. The method according to claim 7, wherein a value of the activation/deactivation status indicator field of the secondary cell is 1 to indicate the activation of the secondary cell.

11. The method according to claim 7, wherein information required for cell activation to complete the cell activation is obtained based on the temporary reference signal.

12. The method according to claim 7, wherein the MAC CE signaling comprising the temporary reference signal index indicator field on the secondary cell is based on the activation/deactivation status indicator field in the MAC CE signaling indicating the activation of the secondary cell.

13. An apparatus, comprising:

at least one processor; and the at least one processor executing instructions to cause the apparatus to:

receive radio resource control (RRC) signaling, wherein the RRC signaling configures a temporary reference signal set at a cell granularity, the temporary reference signal set comprises at least one temporary reference signal, the RRC signaling comprises a temporary reference signal configuration, and the temporary reference signal configuration indicates a temporary reference signal index, an offset of a temporary reference signal, and a gap between different temporary reference signal bursts in a time domain, wherein the offset of the temporary reference signal identifies a time domain offset between time at which the apparatus receives trigger signaling of the temporary reference signal and time at which the temporary reference signal is triggered;

receive media access control (MAC) control element (CE) signaling, wherein the MAC CE signaling comprises an activation/deactivation status indicator field of a secondary cell and a temporary reference signal index indicator field on the secondary cell, and the activation/deactivation status indicator field of the secondary cell indicates activation of the secondary cell; and trigger activation of the secondary cell in response to the MAC CE signaling, and receive the temporary reference signal on the secondary cell based on the temporary reference signal configuration and the temporary reference signal index indicated by the temporary reference signal index indicator field on the secondary cell.

14. The apparatus according to claim 13, wherein the temporary reference signal configuration further indicates a quantity of temporary reference signal bursts in the time domain, a frequency domain resource of the temporary reference signal, and an index of a bandwidth part.

15. The apparatus according to claim 13, wherein the temporary reference signal comprises an aperiodic channel state information (CSI)-reference signal (RS) or an aperiodic tracking reference signal (TRS).

16. The apparatus according to claim 13, wherein a value of the activation/deactivation status indicator field of the secondary cell is 1 to indicate the activation of the secondary cell.

17. An apparatus, comprising:

at least one processor; and the at least one processor executing instructions to cause the apparatus to:

send radio resource control (RRC) signaling, wherein the RRC signaling configures a temporary reference signal set at a cell granularity, the temporary reference signal set comprises at least one temporary reference signal, the RRC signaling comprises a temporary reference signal configuration, and the temporary reference signal configuration indicates a temporary reference signal index, an offset of a temporary reference signal, and a gap between different temporary reference signal bursts in a time domain, wherein the offset of the temporary reference signal identifies a time domain offset between time at which the apparatus receives trigger signaling of the temporary reference signal and time at which the temporary reference signal is triggered; and send media access control (MAC) control element (CE) signaling, wherein the MAC CE signaling comprises an activation/deactivation status indicator field of a secondary cell and a temporary reference signal index indicator field on the secondary cell, and the activation/deactivation status indicator field of the secondary cell indicates activation of the secondary cell.

18. The apparatus according to claim 17, wherein the temporary reference signal configuration further indicates a quantity of temporary reference signal bursts in the time domain, a frequency domain resource of the temporary reference signal, and an index of a bandwidth part.

19. The apparatus according to claim 17, wherein the temporary reference signal comprises an aperiodic channel state information (CSI)-reference signal (RS) or an aperiodic tracking reference signal (TRS).

20. The apparatus according to claim 17, wherein a value of the activation/deactivation status indicator field of the secondary cell is 1 to indicate the activation of the secondary cell.

* * * * *